US012159594B2

(12) United States Patent
Hao et al.

(10) Patent No.: US 12,159,594 B2
(45) Date of Patent: Dec. 3, 2024

(54) METHOD AND APPARATUS FOR GENERATING DRIVING SIGNAL, BACKLIGHT, AND DISPLAY APPARATUS

(71) Applicants: BOE MLED Technology Co., Ltd., Beijing (CN); BOE Technology Group Co., Ltd., Beijing (CN)

(72) Inventors: Wei Hao, Beijing (CN); Chinghua Hung, Beijing (CN); Lingyun Shi, Beijing (CN); Feifei Wang, Beijing (CN); Wengang Su, Beijing (CN); Xingce Shang, Beijing (CN); Kaimin Yin, Beijing (CN); Junwei Zhang, Beijing (CN); Taotao Duan, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/760,266

(22) PCT Filed: Nov. 5, 2021

(86) PCT No.: PCT/CN2021/128939

§ 371 (c)(1),
(2) Date: Aug. 5, 2022

(87) PCT Pub. No.: WO2023/077410

PCT Pub. Date: May 11, 2023

(65) Prior Publication Data

US 2024/0185805 A1 Jun. 6, 2024

(51) Int. Cl.
*G09G 3/34* (2006.01)

(52) U.S. Cl.
CPC ... *G09G 3/3406* (2013.01); *G09G 2310/0243* (2013.01); *G09G 2320/0247* (2013.01); *G09G 2330/021* (2013.01); *G09G 2360/16* (2013.01)

(58) Field of Classification Search
None
See application file for complete search history.

(56) References Cited

U.S. PATENT DOCUMENTS 11,935,489 B2 * 3/2024 Wai .................... G09G 3/2092
2010/0085295 A1 * 4/2010 Zhao .................... G09G 3/3406 345/102

(Continued)

FOREIGN PATENT DOCUMENTS

CN 112992028 A * 6/2021

*Primary Examiner* — Patrick N Edouard
*Assistant Examiner* — Peijie Shen
(74) *Attorney, Agent, or Firm* — Intellectual Valley Law, P.C.

(57) ABSTRACT

A method for generating driving signal is provided. The method includes generating by a first circuit, a first driving signal for a first frame of image, the first driving signal comprising a plurality of first pulse width modulation signals; transmitting the plurality of first pulse width modulation signals to a modulation controller; detecting a vertical synchronization signal; determining whether a most recent first pulse width modulation signal is partially generated when the vertical synchronization signal is detected; and upon determination that the most recent first pulse width modulation signal is partially generated, determining whether to delay generating a second driving signal for a second frame of image.

20 Claims, 16 Drawing Sheets

(56) References Cited

U.S. PATENT DOCUMENTS

| | | | | |
|---|---|---|---|---|
| 2010/0156866 | A1* | 6/2010 | Yeo | G09G 3/3406 345/55 |
| 2011/0121761 | A1* | 5/2011 | Zhao | H05B 45/37 315/312 |
| 2011/0193648 | A1* | 8/2011 | Zhao | H05B 45/3725 332/109 |
| 2011/0199011 | A1* | 8/2011 | Nakazawa | H05B 45/48 315/193 |
| 2013/0120481 | A1* | 5/2013 | Murai | G09G 5/10 345/102 |
| 2014/0306873 | A1* | 10/2014 | Yamashita | G09G 3/3426 345/102 |
| 2020/0211481 | A1* | 7/2020 | Lee | G09G 3/3406 |
| 2021/0366412 | A1* | 11/2021 | Lin | G09G 3/3426 |
| 2022/0310001 | A1* | 9/2022 | Youn | G09G 5/10 |
| 2023/0030201 | A1* | 2/2023 | Youn | G09G 3/3406 |
| 2023/0040656 | A1* | 2/2023 | Wai | G09G 3/3233 |
| 2024/0096268 | A1* | 3/2024 | Zheng | G09G 3/3208 |

* cited by examiner

METHOD AND APPARATUS FOR GENERATING DRIVING SIGNAL, BACKLIGHT, AND DISPLAY APPARATUS

CROSS-REFERENCE TO RELATED APPLICATION

This application is a national stage application under 35 U.S.C. § 371 of International Application No. PCT/CN2021/128939, filed Nov. 5, 2021, the contents of which are incorporated by reference in the entirety.

TECHNICAL FIELD

The present invention relates to display technology, more particularly, to a method for generating driving signal, an apparatus for generating driving signal, a backlight, and a display apparatus.

BACKGROUND

Light emitting diodes such as mini light emitting diodes and micro light emitting diodes can be used in a backlight for a display apparatus. By using a large number of Sight emitting diodes in the backlight, light emission from the backlight can be precisely adjusted in each partition, achieving high dynamic range image display.

SUMMARY

In one aspect, the present disclosure provides a method for generating diving signal comprising generating, by a first circuit, a first driving signal for a first frame of image, the first driving signal comprising a plurality of first pulse width modulation signals; transmitting the plurality of first pulse width modulation signals to a modulation controller; detecting a vertical synchronization signal; determining whether a most recent first pulse width modulation signal is partially generated when the vertical synchronization signal is detected; and upon determination that the most recent first pulse width modulation signal is partially generated determining whether to delay generating a second driving signal for a second frame of image.

Optionally, the method further comprises counting a number of clock signals generated for the most recent first pulse width modulation signal.

Optionally, the method further comprises determining whether a number of clock signals generated for the most recent first pulse width modulation signal when the vertical synchronization signal is detected is less than a first threshold value.

Optionally, upon determination that the number of clock signals is less than the first threshold value, the method further comprises terminating generation of the first driving signal; and generating the second driving signal comprising s plurality of second pulse width modulation signals for the second frame of image.

Optionally, the method further comprises determining whether a difference between a number of clock signals generated for the most recent first pulse width modulation signal when the vertical synchronization signal is detected and a target number of clock signals for the most recent first pulse width modulation signal is less than a second threshold value.

Optionally, upon determination that the difference is less than the second threshold value, the method further comprises terminating generation of the first driving signal, and generating the second driving signal comprising a plurality of second pulse width modulation signals for the second frame of image.

Optionally, the second threshold valve is determined according to:

$$\frac{|Lu(n) - Lu(m)| * f}{|n - m| * Lu(t) * \max\{m, n\}};$$

wherein a stands for a first frame rate of the first frame of image; m stands for a reference frame rate of a reference frame of image; Lu(t) stands for a target luminance value of a respective frame of image; Lu(n) stands for a luminance value of the first frame of image when the vertical synchronization signal is detected; Lu(m) stands for a luminance of the reference frame of image; and f stands for a frequency of clock signals for the plurality of first pulse width modulation signals of the first driving signal.

Optionally, the second threshold valve is determined according to:

$$\frac{0.01\% * f}{\max\{m, n\}}.$$

Optionally, upon determination that the difference is equal to or greater than the second threshold value, further comprising continuing generation of the first driving signal, and delaying generating the second driving signal unit the most recent first pulse width modulation signal is fully generated.

In another aspect, the present disclosure provides an apparatus for generating driving signal, comprising a first circuit configured to generate a first driving signal for a first frame of image, the first driving signal comprising a plurality of first pulse width modulation signals, and configured to detect a vertical synchronization signal; a modulation controller configured to receive the plurality of first pulse width modulation signals to modulate light; wherein, upon detecting the vertical synchronization signal, the first circuit is configured to determine whether a most recent first pulse width modulation signal is partially generated when the vertical synchronization signal is detected; and upon determination that the most recent first pulse widths modulation signal is partially generated, the first circuit is configured to determine whether to delay generating a second driving signal for a second frame of image.

Optionally, the apparatus further comprises a counter configured to count a number of clock signals generated for the most recent first pulse width modulation signal.

Optionally, the first circuit is further configured to determine whether a number of clock signals generated for the most recent first pulse width modulation signal when the vertical synchronization signal is detected is less than a fast threshold value.

Optionally, upon determination that the number of clock signals is less than the first threshold vale, the first circuit is further configured to terminate generation of the first driving signal; and generate the second driving signal comprising s plurality of second pulse width modulation signals for the second frame of image.

Optionally, the first circuit is further configured to determine whether a difference between a number of clock signals generated for the most recent first pulse width modulation signal when the vertical synchronization signal is detected and a target number of clock signals for the most recent first pulse width modulation signal is less than a second threshold value.

Optionally, upon determination that the difference is less than the second threshold value, the first circuit is further configured to terminate generation of the first diving signal; and generate the second driving signal comprising a plurality of second pulse width modulation signals for the second frame of image.

Optionally, wherein the second threshold value is determined according to:

$$\frac{|Lu(n)-Lu(m)|*f}{|n-m|*Lu(t)*\max\{m,n\}};$$

wherein a stands for a first frame rate of the first frame of image; m stands for a reference frame rate of a reference frame of image; Lu(t) stands for a target luminance value of a respective frame of image; Lu(n) stands for a luminance value of the first frame of image when the vertical synchronization signal is detected; Lu(m) stands for a luminance of the reference frame of image; and f stands for a frequency of clock signals for the plurality of first pulse width modulation signals of the first driving signal.

Optionally, the second threshold valve is determined according to:

$$\frac{0.01\%*f}{\max\{m,n\}}.$$

Optionally, upon determination that the difference is equal to or greater than the second threshold value, the first circuit is father configured to continue generation of the first thriving signal, and delay generating the second driving signal until the most recent first pulse width modulation signal is fully generated.

In another aspect, the present disclosure provides a backlight, comprising the apparatus described herein, and a light sources connected to the modulation controller.

In another aspect, the present disclosure provides a display apparatus, comprising a display panel, and the backlight described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a method for generating diving signal, an apparatus for generating driving signal, a backlight, and a display apparatus that substantially obviate owe or more of the problems due to limitations and disadvantages of the related art. In one aspect, the present disclosure provides a method for generating diving signal. In some embodiments, the method includes generating, by a first circuit, a first driving signal for a first frame of image, the first driving signal comprising a plurality of fast pulse width modulation signals; transmitting the plurality of first pulse width modulation signals to a modulation controller; detecting a vertical synchronization signal; determining whether a most recent first pulse width modulation signal is partially generated when the vertical synchronization signal is detected; and upon determination that the most recent first pulse width modulation signal is partially generated, determining whether to delay generating a second driving signal for a second frame of image.

Figure 1:
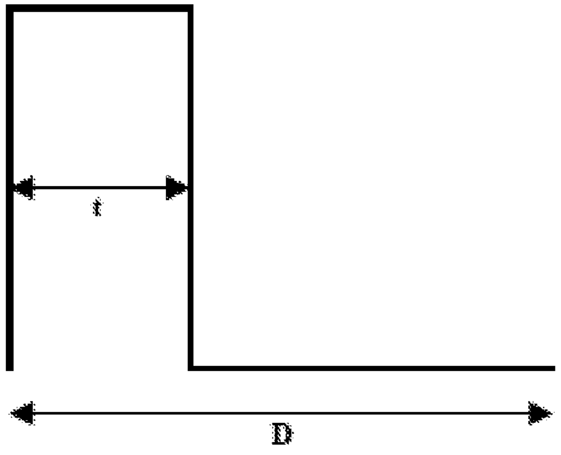
FIG. 1 is a schematic diagram illustrating a pulse width modulation signal is some embodiments according to the present disclosure.

FIG. 1 is a schematic diagram illustrating a pulse width modulation signal is some embodiments according to the present disclosure. Referring to FIG. 1, the pulse width modulation signal in some embodiments has a duration D. In the context of the present disclosure, the plurality of pulse width modulation signals is a same diving signal have a uniform duration (except that when an individual pulse width modulation signal is interrupted). As used herein, the term "partially generated" means that a respective pulse width modulation signal is interrupted so that the resulting duration of the interrupted pulse width modulation signal is less than the duration D.

Pulse widths modulation signals respectively of different driving signals may have different durations. In one example, pulse width modulation signals respectively of two driving signals respectively for two frames of image of two different frame rates typically have different durations. In another example, pulse width modulation signals respectively of two diving signals respectively for two frames of image of a same frame rate typically have a same A pulse width modulation signal, as shown in FIG. 1, may include a high level part and a low level part. The high level part refers to a pulse of a pulse widths modulation signal A sub duration corresponding to the high level part is denoted as t in FIG. 1. A ratio of t to D refers to duty cycle of the pulse width modulation signal. The duty cycle of the pulse width modulation signal may be varied between 0% and 100%.

A partially generated pulse width modulation signal may be interrupted in the middle of its high level part (pulse), or may be interrupted in the middle of its low level part. Where a pulse width modulation signal in a respective driving signal is interrupted, image flicker may occur. When the high level part of the pulse width modulation signal is a respective driving signal is interrupted, the flicker defect is relatively more prominent. When the low level part of the pulse width modulation signal is a respective diving signal is interrupted, the flicker defect is relatively less observable, or not observable.

Pulse width modulation signals respectively of different driving signals may have different duty cycles. In one example, pulse width modulation signals respectively of two diving signals respectively for two frames of image have different duty cycles. In another example, pulse width modulation signals respectively of two diving signals respectively for two frames of image have a same duty cycle.

Figure 2:
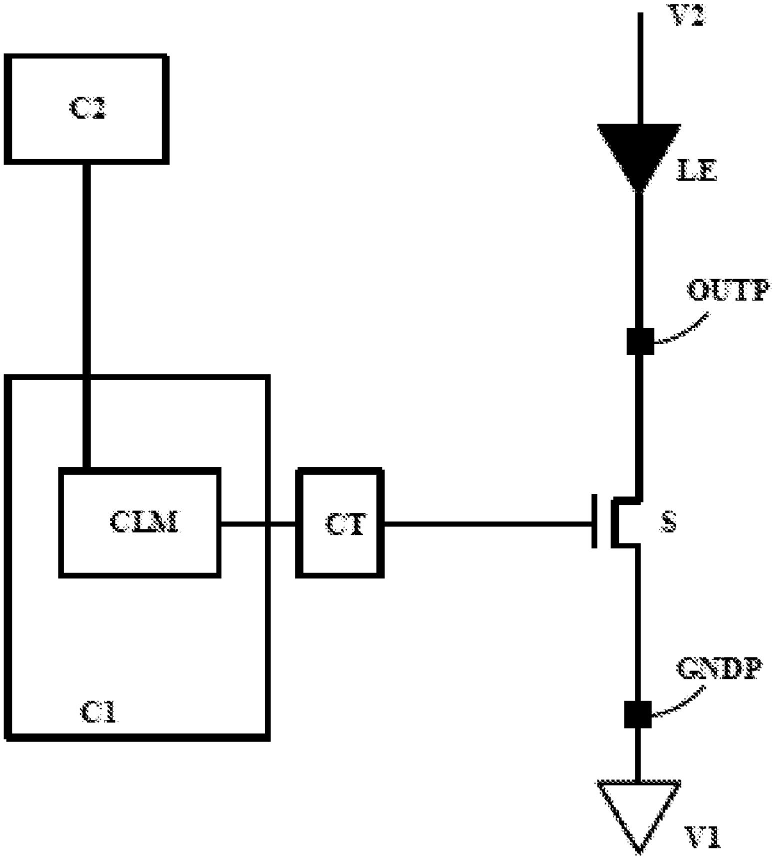
FIG. 2 is a schematic diagram illustrating a circuit for driving a light source in some embodiments according to the present disclosure.

FIG. 2 is a schematic diagram illustrating a circuit for driving a light source in some embodiments according to the present disclosure. Referring to FIG. 2, the circuit is some embodiments includes a first circuit C1 configured to generate a pulse width modulation signal. The circuit further includes a switch S connected to one or more light emitting elements LE (for example, Light emitting elements in a channel of a backlight). Examples of appropriate light emitting elements include a mini light emitting diode, a micro light emitting diode, as organic light emitting diode, and a quantum dot light emitting diode. In one example, the first circuit C1 is a backlight driving integrated circuit.

The first circuit C1 is some embodiments includes a control module CLM configured to generate a driving signal comprising a plurality of pulse width modulation signals, based on as input, e.g., from a second circuit C2. In one example, the second circuit C2 is a controller wait for a backlight. The control module CLM in some embodiments includes a data link layer and a control logic.

In some embodiment, the pulse width modulation signal is transmitted to the switch S. A gate terminal of the switch S is configured to receive the driving signal. A first electrode (e.g., a source electrode or a drain electrode) of the switch S is connected to a cathode of the one or more light emitting elements LE. A second electrode (e.g., a drain electrode or a source electrode) of the switch S is configured to receive a first voltage signal V1 (e.g., a Vas signal). An anode of the one or more light emitting elements LE is configured to receive a second voltage V2 (e.g., a turning-on voltage).

When a respective pulse width modulation signal of the driving signal is valid (e.g., corresponding to a pulse of the signal), the switch S is turned on. During the on state of the switch S, a correct path is established through the switch S for an output pin OUTP (coupled to the one or more light emitting elements LE) to a ground pin GNDP (e.g., configured to receive the first voltage signal V1). The one or more light emitting elements LE are configured to emit light. When the respective pulse width modulation signal is invalid (e.g., corresponding to s valley of the signal), the switch S is turned off, disconnecting the output pin OUTP from the ground pin GNDP, thus the cathode of the one or more light emitting elements LE does not receive the first voltage V1. The cathode of the one or more light emitting elements LE is floating, and the one or more light emitting elements LE are configured not to emit light. Luminance of the que or more light emitting elements LE may be adjusted by varying a duty cycle of each of the pulse width modulation signal of one driving signal.

In one example, the duty cycle of each of the plurality of pulse width modulation signals is 100%, and a corresponding luminance of the one or more light emitting elements LE is 1000 nits. By adjusting the duty cycle of each of the plurality of pulse width modulation signals to 50%, the corresponding luminance of the one or more light emitting elements LE is adjusted to 500 nits.

In some embodiments, the backlight is driver in a free sync driving mode. The free sync technology dynamically refreshes a display panel's frame rate to match the rate at which graphics hardware is outputting frames, e.g., according to video data rendered by a game console or a graphic card. In the free sync driving mode, a display apparatus may use free sync function to display images when the display apparatus receives the video data having non-constant frame rate. Because the frame rate is dynamically refreshed, whereas the pulse width modulation signal is generated based on clock signals, the frequency of which is fixed, different frames of images having different frame rates correspond to different numbers of pulse width modulation signals is respective driving signals, as explained above. Moreover, when switching between two frames of images having different frame rates, a present pulse width modulation signal corresponding to the present frame of image may be interrupted, resulting in a partial pulse width modulation signal. These issues lead to variations in image brightness among frames of images having different frame rates. The present method and apparatus obviate the issue of unstable image brightness and image flickers.

Figure 3:
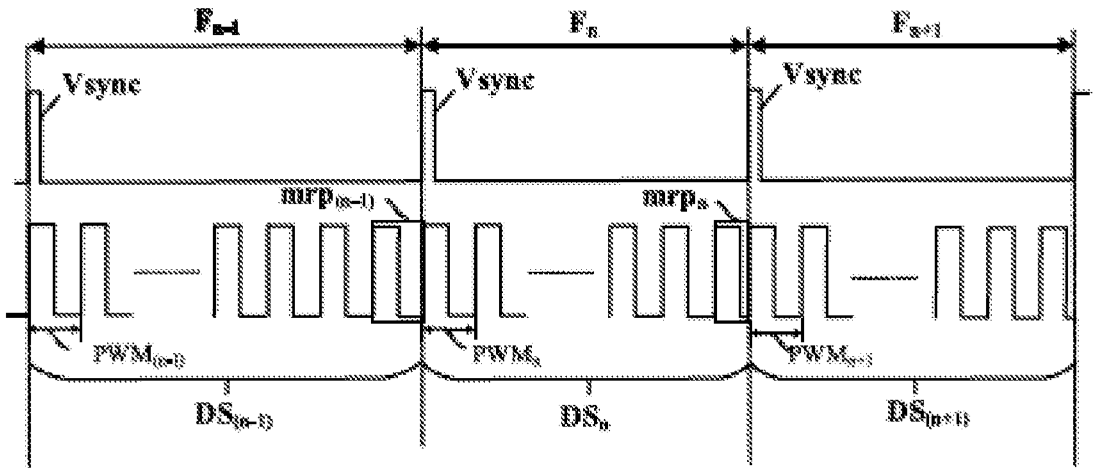
FIG. 3 illustrates a process of generating diving signals in some embodiments according to the present disclosure.

FIG. 3 illustrates a process of generating driving signals in some embodiments according to the present disclosure. Referring to FIG. 3, the method in some embodiments includes generating s first driving signal $DS_n$ for a first frame of image $F_s$. As discussed above, different frames of images (e.g., a previous frame of images $F_{n-1}$, a first frame of image $F_a$, and a second frame of image $F_{a+1}$) may correspond to different numbers of pulse width modulation signals.

As shown in FIG. 3, a most recent first pulse width modulation signal $mrp_n$ of the plurality of first pulse width modulation signals $PWM_s$ is only partially generated when a vertical synchronization signal Vsync is detected. Typically, the vertical synchronization signal Vsync refers to a synchronization signal representing a beginning of each and every frame of images. In one specific example depicted is FIG. 3, a starting point of a respective driving signal is aligned with a rising edge of a vertical synchronization signal Vsync.

As used herein, the term "detecting a vertical synchronization signal" or "vertical synchronization signal detected" encompasses various appropriate means of detection. In one example, the vertical synchronization signal is directly derived by the first circuit. For example, the first circuit is configured to receive data signal via a data input pin, the vertical synchronization signal is implicitly contained in the data signal. As discussed above, the vertical synchronization signal refers to a synchronization signal representing a beginning of each and every frame of images. Thus, based on the data signals received from the data input pin, which contain signals indicating the beginning of each and every frame of images, the control module (e.g., a control logic) of the first circuit is configured to derive the vertical synchronization signal. In another example, the first circuit is configured to receive the vertical synchronization signal directly. For example, the first circuit in some embodiments includes a pin for receiving the vertical synchronization signal, the control module (e.g., the control logic) is connected to the pin, thereby receiving the vertical synchronization signal derived by the control module.

Referring to FIG. 3, the method in some embodiments includes generating s first driving signal $DS_n$ for a first frame of image $F_n$; and a second driving signal $DS_{(n+1)}$ for a second frame of image $F_{s+1}$. The first driving signal $DS_n$ includes a plurality of first pulse width modulation signals $PWM_a$, and the second driving signal $DS_{(n+1)}$ includes a plurality of second pulse width modulation signals $PWM_{(n+1)}$. The first frame of image $F_a$ and the second frame of image $F_{a+1}$ are two consecutive frames of image.

In some embodiments, any two or all of the previous frame of image $F_{n-1}$, the first frame of image $F_s$, and the second frame of image $F_{n+1}$ may have different frequencies. For example, in a free sync driving mode, frequencies of frames of image can switch among values selected from 60 Hz, 120 Hz, 144 Hz, 240 Hz, and 480 Hz. Correspondingly, any two or all of the previous frame of image $F_{n-1}$, the first frame of image $F_s$ and the second frame of image $F_{n+1}$ may have different durations. For example, durations of frames of image in the free sync driving mode can switch among values selected from 1/60 second, 1/120 second, 1/144 second, 1/240 second, and 1/480 second. In one specific example, the previous frame of image $F_{n-1}$ has a frame rate of 120 MHz, the first frame of image $F_s$ and the second frame of image $F_{n+1}$ have a frame rate of 144 MHz. Because the first frame of image $F_s$ and the second frame of image $F_{n+1}$ have a frame rate higher than the frame rate of the previous frame of image $F_{n-1}$, correspondingly the first frame of image $F_s$ and the second frame of image $F_{n+1}$ have a frame length smaller than the frame length of the previous frame of image $F_{n-1}$.

Referring to FIG. 3, when a vertical synchronization signal Vsync is detected, the most recent first pulse width modulation signal $mrp_s$ of the plurality of first pulse width modulation signals $PWM_a$ is only partially generated. As a comparison, a most recent previous pulse width modulation signal $mrp_{(n-1)}$ of a plurality of previous pulse width modulation signals $PWM_{(n-1)}$ of a previous driving signal $DS_{(n-1)}$ is fully generated when a vertical synchronization signal Vsync is detected Starting points of driving signals are respectively aligned with rising edges of vertical synchronization signals. The most recent first pulse width modulation signal $mrp_n$ is shorter in duration than the most recent previous pulse width modulation signal $mrp_{(n-1)}$.

The inventors of the present disclosure discover that, when the most recent first pulse width modulation signal $mrp_s$ is interrupted upon receiving the vertical synchronization signal Vsync, it results is luminance variation between fames of images having different frame rates, for example, between the previous frame of image $F_{n-1}$ and the first frame of image $F_n$, resulting in image flicker. The inventors of the present disclosure discover that, when the high level part of the most recent first pulse width modulation signal $mrp_s$ is interrupted, the image flicker issue is particularly problematic. However, even when the low level part of the most recent first pulse width modulation signal $mrp_n$ is interrupted, luminance variation between adjacent frames of images having different frame rates, for example, between the previous frame of image $F_{n-1}$ and the first frame of image $F_a$, still occurs. In one specific example depicted in FIG. 3, the low level part of the most recent first pulse width modulation signal $mrp_n$ is interrupted upon receiving the vertical synchronization signal Vsync.

In some embodiment, pulse width modulation signals of any two or all of the previous frame of image $F_{n-1}$, the first frame of image $F_a$, and the second frame of image $F_{n+1}$ may have a same duty cycle or different duty cycles. The inventors of the present disclosure discover that, when pulse width modulation signals of two adjacent frames of images (for example, the previous frame of image $F_{n-1}$ and the fast frame of image $F_a$) have a same duty cycle, she image flicker issue is particularly problematic. However, when pulse width modulation signals of two adjacent frames of images have different duty cycles, luminance variation between adjacent frames of images having different frame rates, for example, between the previous frame of image $F_{n-1}$ and the first frame of image $F_a$, still occurs. In one specific example depicted in FIG. 3, pulse width modulation signals respectively of the previous frame of image $F_{n-1}$, the first frame of image $F_a$, and the second frame of image $F_{n+1}$ may have a same duty cycle.

Figure 4:
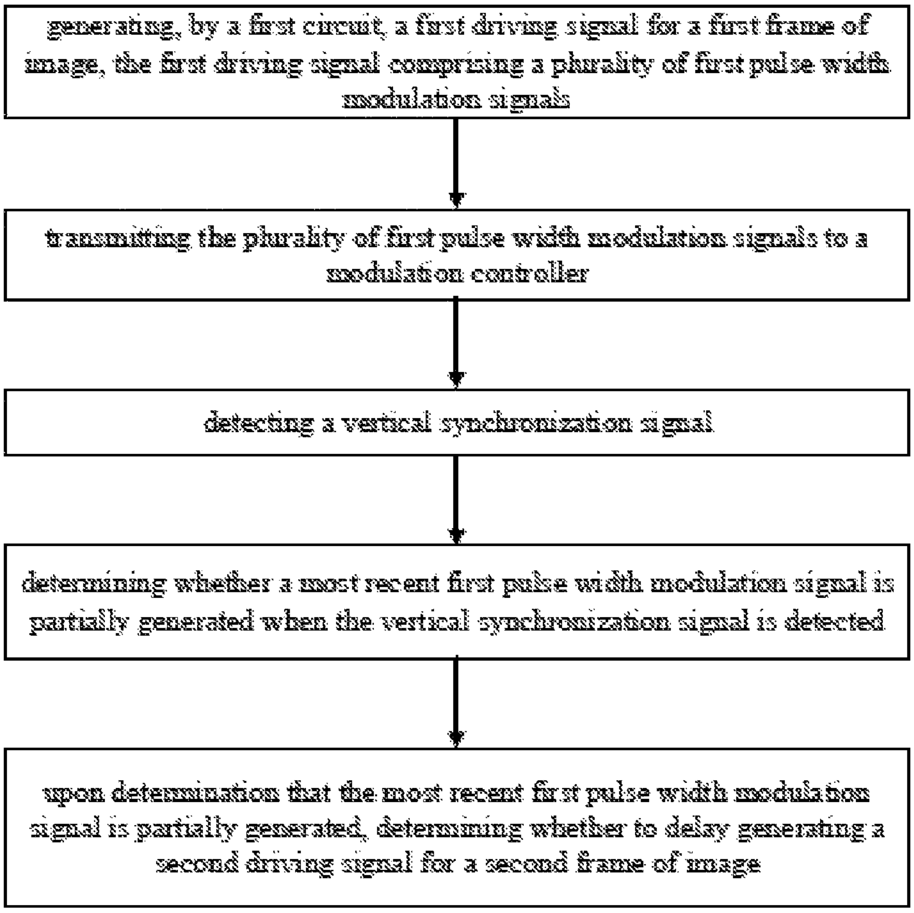
FIG. 4 is a flow chart illustrating a method in some embodiments according to the present disclosure.

FIG. 4 is a flow chart illustrating a method in some embodiments according to the present disclosure. Referring to FIG. 4, the method in some embodiments includes generating, by a first circuit, a first driving signal for a first frame of image, the first driving signal comprising a plurality of first pulse width modulation signals; transmitting the plurality of first pulse width modulation signals to a modulation controller, detecting a vertical synchronization signal; determining whether a most recent first pulse width modulation signal is partially generated when the vertical synchronization signal is detected; and upon determination that the most recent first pulse width modulation signal is partially generated, determining whether to delay generating a second driving signal for a second frame of image.

Figure 5:
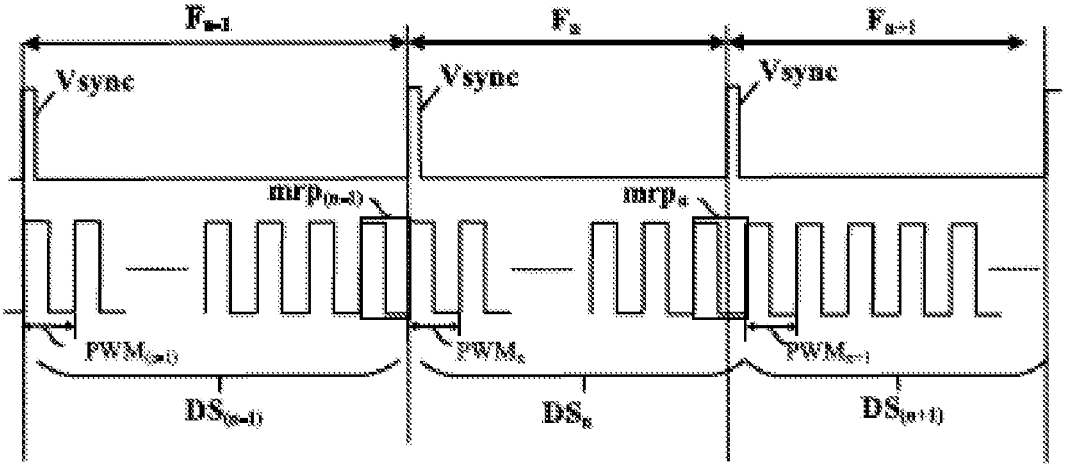
FIG. 5 illustrates a process of generating diving signals in souse embodiments according to the present disclosure.

FIG. 5 illustrates a process of generating driving signals in some embodiments according to the present disclosure. Referring to FIG. 5, the method in some embodiments includes generating (e.g., by a first circuit) a first driving signal $DS_n$ for a first frame of image $F_a$, the first driving signal $DS_n$ including a plurality of first pulse width modulation signals $PWM_s$; transmitting the plurality of first pulse width modulation signals $PWM_a$ to a modulation controller; and detecting a vertical synchronization signal Vsync (e.g., directly or indirectly from a second circuit). When the vertical synchronization signal Vsync is detected, the most recent first pulse width modulation signal $mrp_n$ is only partially generated. The method in some embodiments includes determining whether to delay generating a second driving signal for a second frame of image. The method in some embodiments includes delaying a start of the second driving signal $DS_{n+1}$ at least until the most recent first pulse width modulation signal $mrp_s$ is fully generated. Comparing FIG. 5 with FIG. 3, the second driving signal $DS_{n+1}$ in FIG. 5 is a delayed driving signal in a sense that the start of the second driving signal $DS_{n+1}$ is delayed at least until the most recent first pulse width modulation signal $mrp_n$ is fully generated. Termination of the first driving signal $DS_n$ is delayed at least until the most recent first pulse width modulation signal $mrp_s$ is fully generated.

Optionally, the first frame of wage $F_a$ and the second frame of image $F_{a+1}$ have different frame rates.

Optionally, the first frame of image $F_n$ and the second frame of image $F_{n+1}$ have a same frame rate.

In some embodiment, referring to FIG. 3 and FIG. 5, the method further includes generating a second driving signal comprising a plurality of second pulse width modulation signals $PWM_{(n+1)}$ for a second frame of image $F_{n+1}$.

Optionally, the plurality of first pulse width modulation signals PWM, and the plurality of second pulse width modulation signals $PWM_{(n+1)}$ have different duty cycles.

Optionally, the plurality of first pulse width modulation signals PWM, and the plurality of second pulse width modulation signals $PWM_{(n+1)}$ have a same duty cycle.

In some embodiments, referring to FIG. 5, none of the pulse width modulation signals corresponding to all frames of image is a partial pulse width modulation signal Optionally, none of the pulse width modulation signals corresponding to all frames of image includes a partial pulse.

In some embodiments, referring to FIG. 5, the method further includes generating a second driving signal $DS_{(n+1)}$ comprising a plurality of second pulse width modulation signals $PWM_{(n+1)}$ for a second frame of image $F_{n+1}$. Optionally, upon determination that the most recent first pulse width modulation signal $mrp_n$ is partially generated when the vertical synchronization signal Vsync is detected, the method further includes delaying generating the second driving signal $DS_{(n+1)}$ at least until the most recent first pulse width modulation signal $mrp_n$ is fully generated.

Referring to FIG. 2, the circuit in some embodiments further includes a counter CT configured to count a number of clock signals generated for the most recent first pulse width modulation signal. The counter CT in some embodiments is connected to the control module CLM (which includes a data link layer and a control logic). Accordingly, the method in some embodiments further includes counting a number of clock signals generated for a respective first pulse width modulation signal.

In some embodiments, the pulse widths modulation signals is a respective driving signal are signals generated based on clock signals having a frame frequency as the clock signals produced by an oscillator (discussed in further details in FIG. 13 and FIG. 14) in a control circuit. A frequency of the clock signals produced by a particular oscillator is fixed, for example, 16 MHz or 24 MHz, thus the frequency of the clock signals for the pulse width modulation signals is also fixed. Because a respective pulse width modulation signal is a signal generated based on clock signals, the counter CT can be configured to count a number of clock signals generated for the respective pulse width modulation signal. The relationship between the respective pulse width modulation signal and clock signals generated therefor can be illustrated using a term "bit". For example, a respective pulse width modulation signal having 12 bits is generated based on $2^{12}$ number of clock signals. Each of the clock signals has a duration of $1/(2^{12})$ of the duration D of the respective pulse width modulation signal.

To further illustrate, in one specific example, a frequency of the clock signals produced by aw oscillator is 16 MHz, which means a duration of each of the clock signals is $1/16000000$ second. The respective pulse width modulation signal has 12 bits, thus is generated based on 4096 clock signals. Accordingly, the duration D of the respective pulse width modulation signal would be $4096/16000000$ second. The clock signal may be considered as the resolution of the respective pulse width modulation signal. For example, the shortest possible high level part in the respective pulse width modulation signal is generated based on one single clock signal, which has a duration of $1/16000000$ second.

Because the frequency of the clock signals produced by a particular oscillator and the frequency of the clock signals for generating the pulse width modulation signals are fixed, fames of image of different frame rates may include different rusher of pulse width modulation signal. In one example, the duration D) of the respective pulse width modulation signal is $4096/16000000$ second. In a first frame of image having a first frame rate of 60 Hz, the fast frame of image contains about 65 pulse width modulation signals. In a second frame of image having a second frame rate of 144 MHz, the second home of image contains about 27 pulse width modulation signals.

Figure 6:
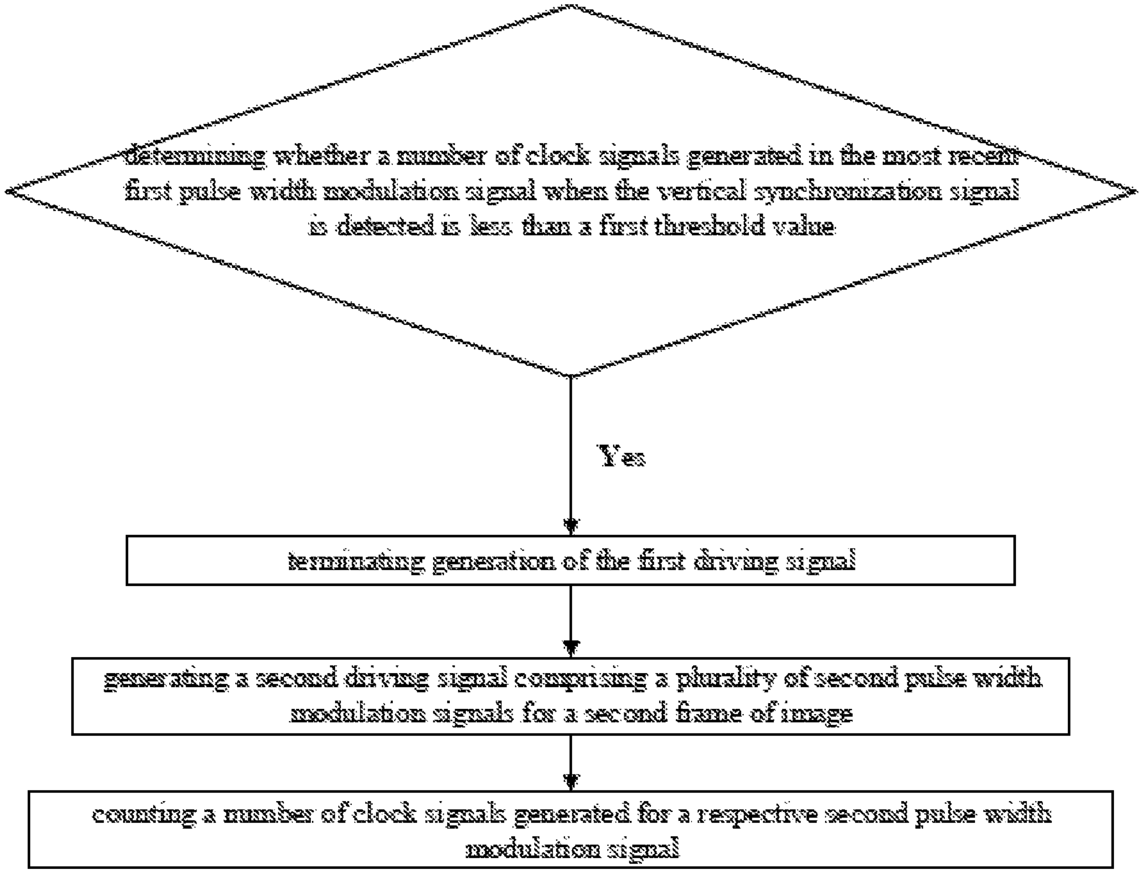
FIG. 6 is a flow chart illustrating a method in some embodiments according to the present disclosure.

FIG. 6 is a flow chart illustrating a method in some embodiments according to the present disclosure. Referring to FIG. 6, the method in some embodiments includes determining whether a number of clock signals generated for the most recent first pulse width modulation signal whew the vertical synchronization signal is detected is less than a first threshold value. Upon determination what the number of clock signals is less than the first threshold value, the method is some embodiments further includes terminating generation of the first driving signal; and generating a second diving signal comprising a plurality of second pulse width modulation signals for a second frame of image.

Figure 7:
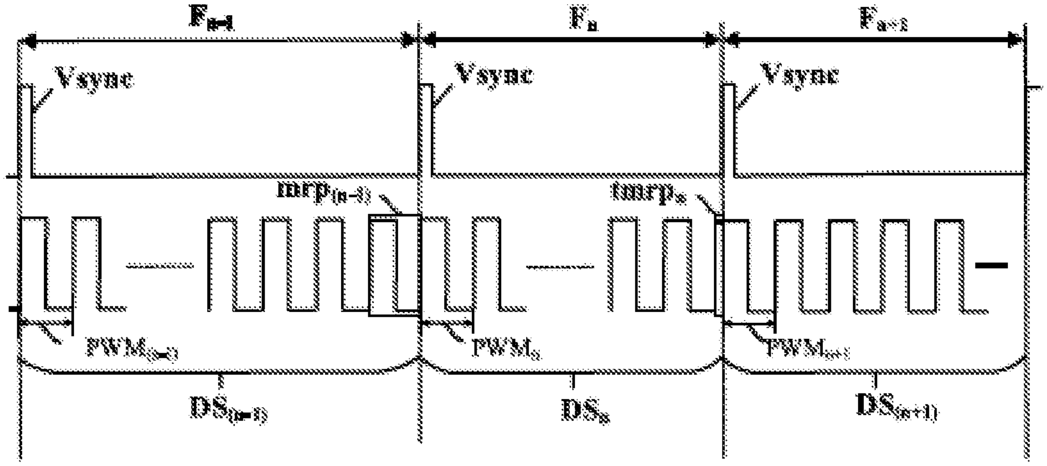
FIG. 7 illustrates a process of generating driving signals in some embodiments according to the present disclosure.

FIG. 7 illustrates a process of generating driving signals in some embodiments according to the present disclosure. Referring to FIG. 7, the method in some embodiments incudes, upon determination that the number of clock signals is less than the first threshold value, terminating generation of the most recent first pulse width modulation signal (denoted as $tmrp_n$ in FIG. 7); and generating a second driving signal $DS_{(n+1)}$ comprising s plurality of second pulse width modulation signals $PWM_{(n+1)}$ for a second frame of image $F_{a+1}$. Optionally, the method further includes counting a number of clock signals generated for a respective second pulse width modulation signal. Optionally, the process is reiterated throughout the image display.

Figure 8:
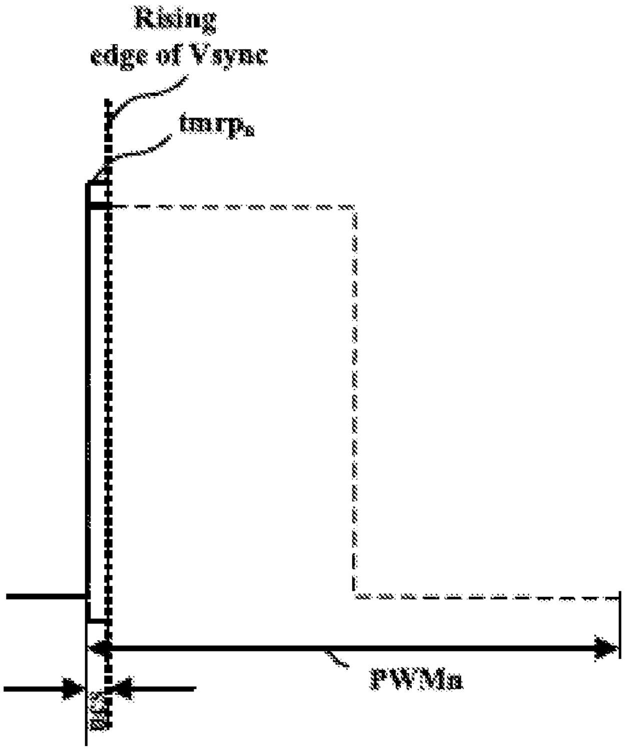
FIG. 8 illustrates a process of terminating a most recent first pulse width modulation signal in some embodiments according to the present disclosure.

FIG. 8 illustrates a process of terminating a most recent first pulse width modulation signal in some embodiments according to the present disclosure. Referring to FIG. 8, the method includes counting a number (denoted as "ncs" in FIG. 8) of clock signals generated for the most recent first pulse width modulation signal $tmrp_n$. In one specific example, the number of clock signals generated for the first pulse width modulation signal PWM1 is merely, for example, 13. When the vertical synchronization signal Vsync is detected (denoted by "Rising edge of Vsync"), the number of clock signals generated for the most recent first pulse width modulation signal $tmrp_n$ is compared with the first threshold value. When it is determined that the number of clock signals generated for the most recent first pulse width modulation signal tarp is less than the first threshold value, the method includes terminating generation of the most recent first pulse width modulation signal $tmrp_n$, as denoted in FIG. 8. In FIG. 8, the dotted line is the pulse width modulation signal depicted the part of the pulse width modulation signal not generated before termination.

As discussed above, a respective pulse width modulation signal having N bits is generated based on $2^N$ number of clock signals. Each of the clock signals has a duration that is $1/(2^N)$ of the duration D of the respective pulse width modulation signal. When only a small number of clock signals (e.g., 13 clock signals) are generated for a pulse width modulation signal, the frame of image (e.g., the first frame of image $F_s$ in FIG. 8) may be interrupted without image flickers.

In some embodiments, the first threshold value is a value smaller than 1% (e.g., smaller than 0.5%, smaller than 0.4%, smaller than 0.3%, smaller than 0.2%, smaller than 0.1%, smaller than 0.05%, smaller than 0.02%, smaller than 0.01%, smaller than 0.005%, smaller than 0.002%, or smaller than 0,001%) of a target member of clock signals for a respective first pulse width modulation signal (e.g., a total number of clock signals generated for a first pulse width modulation signal that is not interrupted by the vertical synchronization signal Vsync). In one example, the first pulse width modulation signal that is not interrupted by the vertical synchronization signal Vsync is generated based on 4096 number of clock signals (e.g., the target number of clock signals), and the first threshold value is a value smaller than 50 (e.g., smaller than 40, smaller than 30, smaller than 20, smaller than 15, smaller than 10, or smaller than 5) number of clock signals.

In some embodiments, upon determination what the member of clock signals is equal to or greater than the first threshold value, the method further includes continuing generation of the most recent first pulse width modulation signal. Optionally, generation of the most recent first pulse width modulation signal is continued until the target number of clock signal for the most recent first pulse width modulation signal is reached, before generating a second driving signal for a second name of image.

Figure 9:
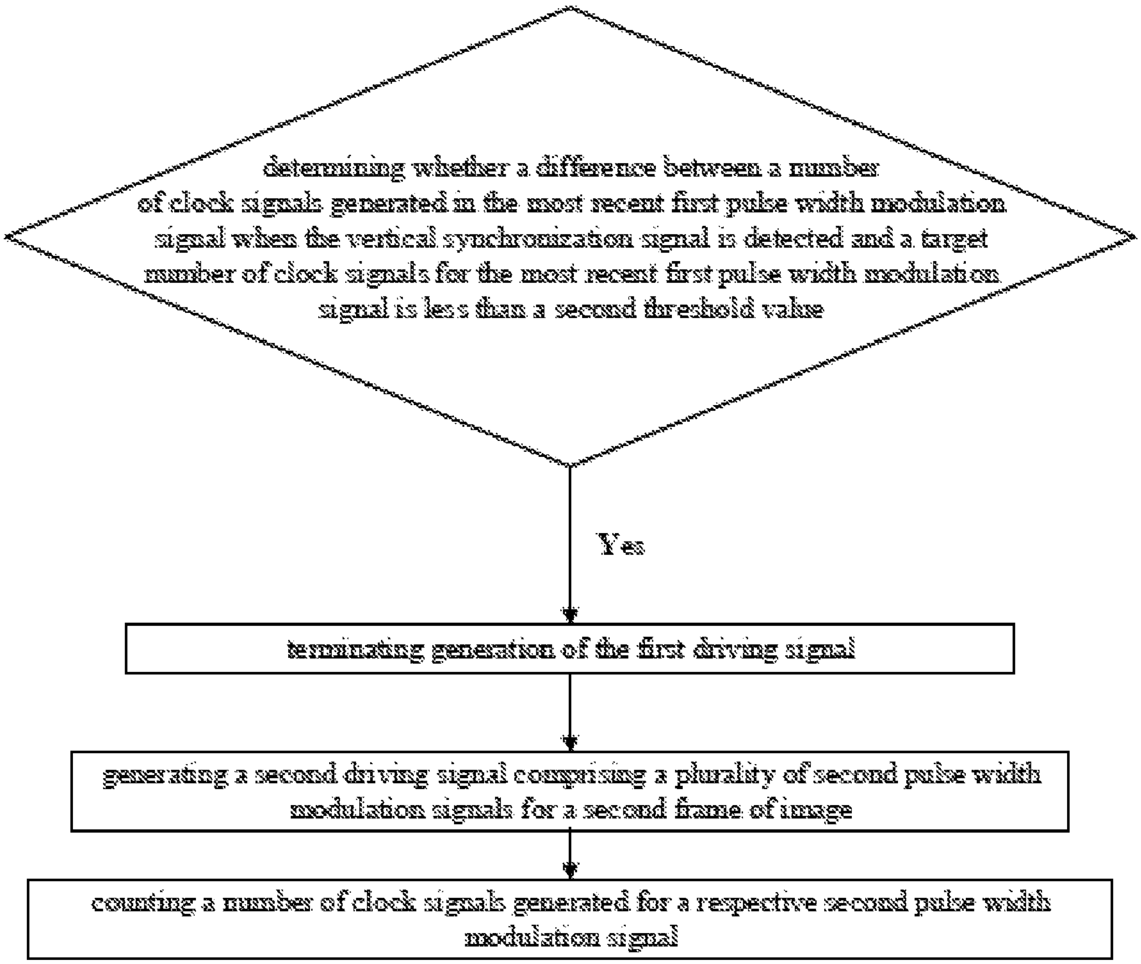
FIG. 9 is a flow chart illustrating a method in some embodiments according to the present disclosure.

FIG. 9 is a flow chart illustrating a method in some embodiments according to the present disclosure. Referring to FIG. 9, the method in some embodiments further includes determining whether a difference between a number of clock signals generated for the most recent first pulse width modulation signal $mrp_n$ when the vertical synchronization signal is detected and a target number of clock signals for the most recent first pulse width modulation signal $mrp_s$ is less than a second threshold value. Optionally, upon determination that the difference is less than the second threshold value, the method further includes terminating generation of the first driving signal; and generating a second driving signal comprising a plurality of second pulse width modulation signals for a second frame of image. Optionally the method further includes counting a number of clock signals generated for a respective second pulse width modulation signal. Optionally, the process is reiterated throughout the image display.

Figure 10:
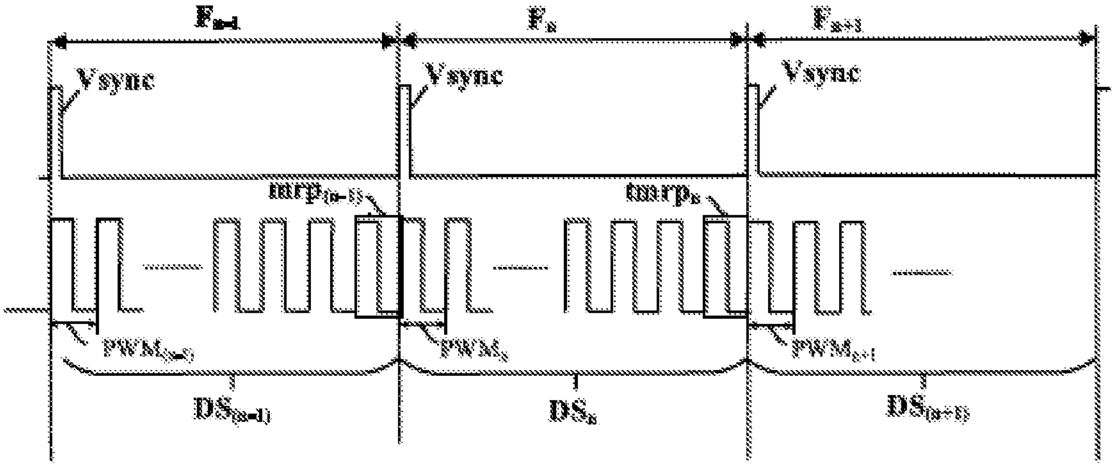
FIG. 10 illustrates a process of generating driving signals in some embodiments according to the present disclosure.

FIG. 10 illustrates a process of generating driving signals in some embodiments according to the present disclosure. Referring to FIG. 10, the method is some embodiments includes, upon determination that the difference is less than the second threshold value, terminating generation of the most recent first pulse width modulation signal; and generating a second driving signal $DS_{(a+1)}$ comprising a plurality of second pulse width modulation signals $PWM_{(n+1)}$ for a second frame of image $F_{n+1}$. Optionally, the method further includes counting a number of clock signals generated for a respective second pulse width modulation signal Optionally, the process is reiterated throughout the image display.

Figure 11:
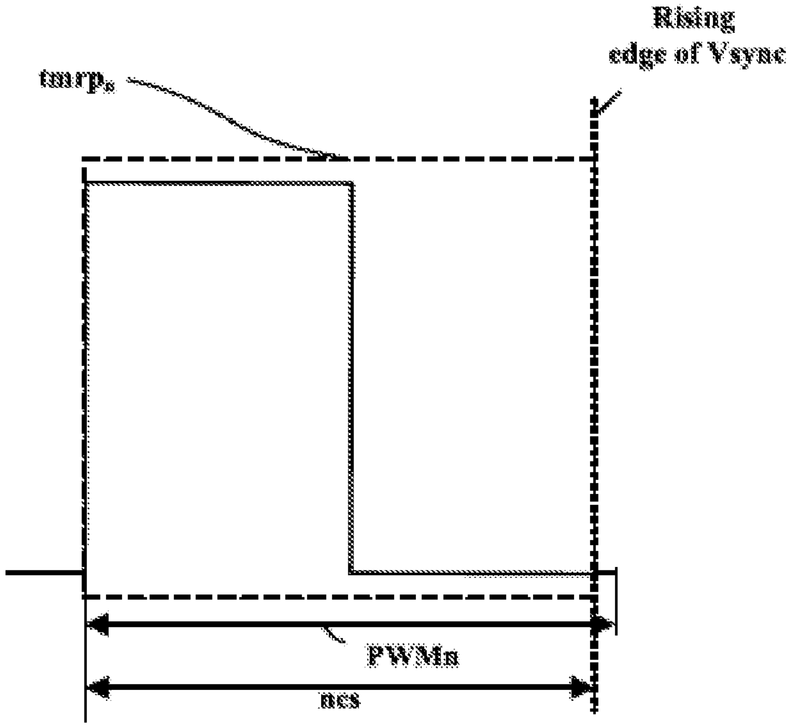
FIG. 11 illustrates a process of terminating a most recent first pulse width modulation signal in some embodiments according to the present disclosure.

FIG. 11 illustrates a process of terminating a most recent first pulse width modulation signal in some embodiments according to the present disclosure. Referring to FIG. 11, the method incudes counting a number of clock signals generated for the most recent first pulse width modulation signal, and determining whether a difference between the member (devoted as "ncs" in FIG. 11) of clock signals generated for the most recent first pulse width modulation signal when the vertical synchronization signal Vsync is detected (denoted by "Rising edge of Vsync") and a target number of clock signals for the most recent first pulse width modulation signal is less than a second threshold value. In one example, the target number of clock signals for the most recent first pulse width modulation signal is a total number of clock signals for a first pulse width modulation signal that is not interrupted by the vertical synchronization signal Vsync. For example, the target number of clock signals for the most recent first pulse width modulation signal equals to a total number of clock signals for a previously adjacent first pulse width modulation signal that is not interrupted by the vertical synchronization signal Vsync. In one specific example, the difference between a number of clock signals generated for the most recent first pulse width modulation signal when the vertical synchronization signal Vsync is detected and a target number of clock signals for the most recent first pulse width modulation signal is 2 (e.g., less than 3).

In some embodiments, the second threshold value is a value smaller than 1% (e.g., smaller than 0.5%, smaller than 0.4%, smaller than 0.3%, smaller than 0.2%, smaller than 0.1% smaller than 0.05%, smaller than 0.02%, smaller than 0.01%, smaller than 0.005%, smaller than 0.002%, or smaller than 0.001%) of a target number of clock signal for a respective first pulse width modulation signal (e.g., a total number of clock signals for a first pulse width modulation signal that is not interrupted by the vertical synchronization signal Vsync). In one example, without interruption by the vertical synchronization signal Vsync, the first pulse width modulation signal that is not interrupted by the vertical synchronization signal Vsync is generated based on 4096 number of pulses (e.g., the target number of clock signals), and the second threshold value is a value smaller than 50 (e.g., smaller than 40, smaller than 30, smaller than 20, smaller than 15, smaller than 10, or smaller than 5) number of clock signals.

In some embodiments, upon determination that the difference is equal to or greater than the second threshold value, the method further includes continuing generation of the most recent first pulse width modulation signal, and delaying generating the second driving signal until the most recent first pulse width modulation signal is fully generated. Optionally, generation of the most recent first pulse width modulation signal is continued until the target number of clock signals for the most recent first pulse width modulation signal is reached, before generating a second driving signal for a second frame of rage. Optionally, generation of the most recent first pulse width modulation signal is continued until the difference is less than the second threshold value, before generating a second driving signal for a second frame of image.

Figure 12:
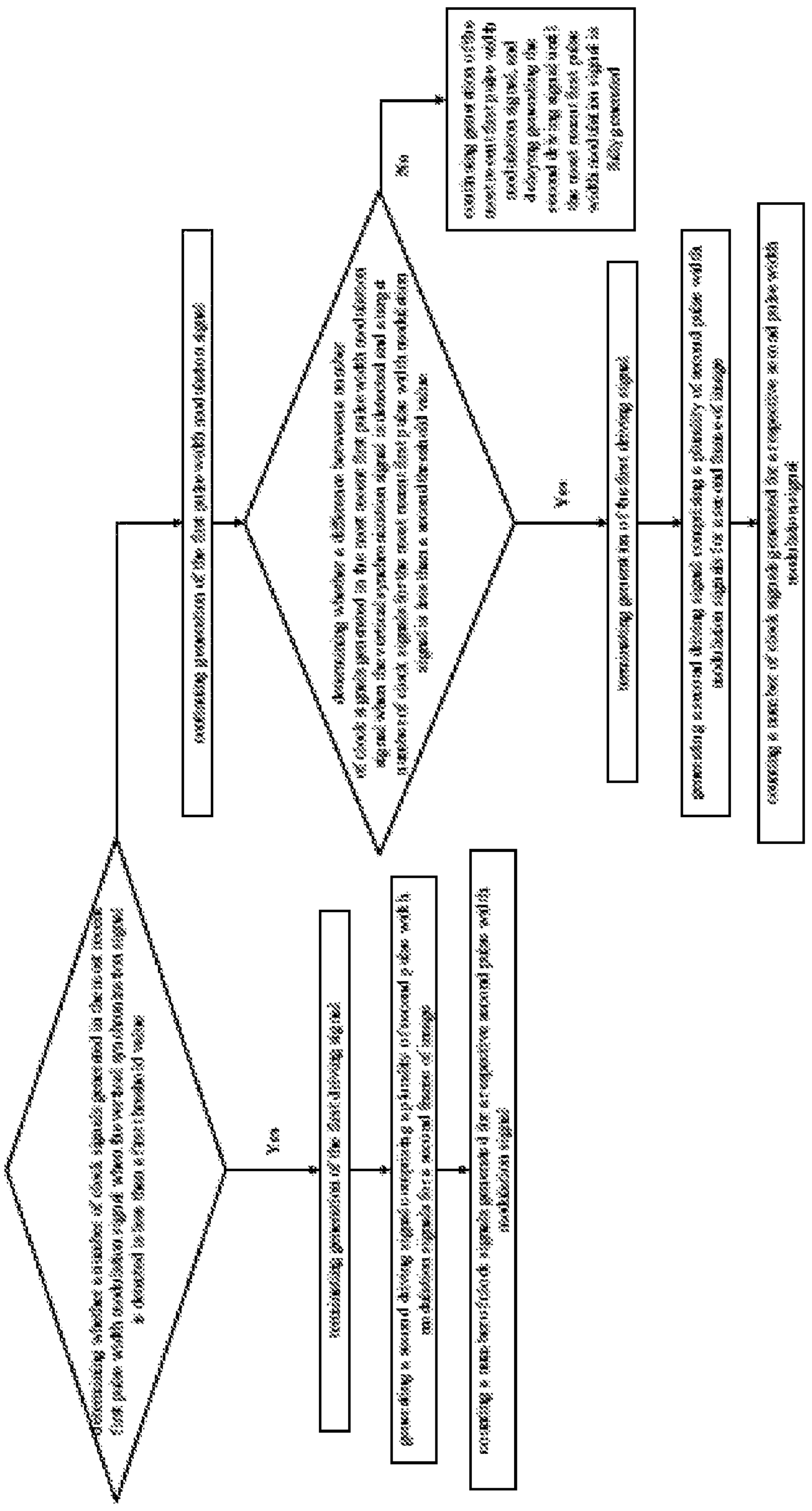
FIG. 12 is a flow chart illustrating a method is some embodiments according to the present disclosure.

FIG. 12 is a flow chat illustrating a method is some embodiments according to the present disclosure. Referring to FIG. 12, the method is some embodiments includes determining whether a number of clock signals generated for the most recent first pulse width modulation signal whew the vertical synchronization signal is detected is less than a first threshold value. Upon determination what the number of clock signals is less than the first threshold value, the method further includes terminating generation of the first driving signal; ad generating a second driving signal comprising a plurality of second pulse width modulation signals for a second frame of image. Upon determination that the number of clock signals is equal to or greater than the first threshold value, the method further includes continuing generation of the most recent first pulse width modulation signal; and determining whether a difference between a number of clock signals generated for the most recent first pulse width modulation signal when the vertical synchronization signal is detected and a target number of clock signals for the most recent first pulse width modulation signal is less than a second threshold value. Upon determination that the difference is less than the second threshold value, the method further includes terminating generation of the first driving signal; and generating a second driving signal comprising a plurality of second pulse width modulation signals for a second frame of image. Upon determination that the difference is equal to or greater than the second threshold value, the method further includes continuing generation of the most recent first pulse width modulation signal, and delaying generating the second driving signal until the most recent first pulse width modulation signal is fully generated. Optionally, generation of the most recent first pulse width modulation signal is continued until the target number of clock signals for the most recent first pulse width modulation signal is reached, before generating a second driving signal for a second frame of image. Optionally, generation of the most recent first pulse width modulation signal is continued until the difference is less than the second threshold value, before generating a second driving signal fox a second frame of image.

In some embodiments, the second threshold value is determined according to:

$$\frac{|Lu(n) - Lu(m)| * f}{|n - m| * Lu(t) * \max\{m, n\}};$$

wherein a stands for a first frame rate of the first frame of image; m stands for a reference frame rate of a reference frame of image; Lu(t) stands for a target luminance value of a respective frame of image; Lu(n) stands for a luminance value of the first frame of image when the vertical synchronization signal is detected; Lu(m) stands for a luminance of the reference frame of image; and f stands for a frequency of clock signals for the first driving signal. In que example, the target luminance value of a respective frame of image is 400 nits for a gray screen image. Is another example, the target luminance value of a respective frame of image is 1000 nits for a white screen image. In one example, a white screen image is au image having grayscale value of (255, 255, 255). In another example, a gay screen image is as image having grayscale value of (102, 102, 102). The luminance value is correlated to a duty cycle of the pulse width modulation signal.

In some embodiment, ax inter-frame luminance difference ΔLu may be defined according to:

$$\Delta Lu(nits/\mathrm{Hz}) = \frac{|Lu(n) - Lu(m)|}{|n - m|};$$

wherein a stands for a first frame rate of the first frame of image; m stands for a reference frame rate of a reference frame of image, a and m being different positive integers; Lu(n) stands for a luminance value of the first frame of image when the vertical synchronization signal is detected;

and Lu(m) stands for a luminance of the reference frame of image; and f stands for a frequency of clock signals for the first driving signal.

Optionally, the frequencies of clock signals for a plurality of pulse width modulation signals are the same, e.g., fixed. In one example, the frequencies of clock signals generated for pulse width modulation signals respectively of the first name of image and the reference frame of image are the same. In one specific example, f=16 MHz.

In some embodiments, the first frame of image and the reference frame of image are two different frames of image having different frame rates. Optionally, the first frame of image and the reference frame of image are two adjacent frames of image. Optionally, the reference frame of image is a frame of image immediately previously adjacent to the first frame of image. Optionally, the reference frame of image is a frame of image immediately next adjacent to the first frame of image. In one specific example, n=120 Hz, and m=60 Hz. In another specific example, n=60 Hz, and m=120 Hz.

In one example, ΔLu for a white screen image is less than 0.03 nits/Hz. In one example, a white screen image is an image having grayscale value of (256, 256, 256). In another example, the target luminance value of a respective frame of image is 1000 nits for a white screen image. Accordingly, in one example, for a while screen image, $$\frac{|Lu(n) - Lu(m)|}{|n - m| * Lu(t)} \le \frac{0.03}{1000} = 0.003\%.$$

Optionally, for a white screen image, the second threshold value is determined according to:

$$\frac{0.003\% * f}{\max\{m, n\}}.$$

In one example, ΔLu for a gray screen image is less than 0.04 nits/Hz. In another example, a gray screen image is an image having grayscale value of (128, 128, 128). In one example, the target luminance value of a respective frame of image is 400 nits for a gray screen image. Accordingly, in one example, for a gray screen page.

$$\frac{|Lu(n) - Lu(m)|}{|n - m| * Lu(t)} \le \frac{0.04}{400} = 0.01\%.$$

Optionally, for a gray screen image, the second threshold value is determined according to:

$$\frac{0.01\% * f}{\max\{m, n\}}.$$

In another aspect, the present disclosure provides an apparatus for generating driving signal. In some embodiments, the apparatus includes a first circuit configured to generate a fast driving signal for a first frame of image, the first driving signal comprising a plurality of Est pulse width modulation signals, and configured to detect a vertical synchronization signal; and a modulation controller configured to receive the plurality of first pulse width modulation signals to modulate light. Referring to FIG. 2, the modulation controller is some embodiments includes a switch S. Optionally, the modulation controller further includes a counter CT.

In some embodiments, upon receiving the vertical synchronization signal, the first circuit is configured to determine whether a most recent first pulse width modulation signal is partially generated when the vertical synchronization signal is detected; and upon determination that the most recent first pulse width modulation signal is partially generated, the first circuit is configured to determine whether to delay generating a second driving signal for a second frame of image.

In some embodiments, the first circuit is further configured to generate a second driving signal for a second frame of image, the second diving signal comprising a plurality of second pulse width modulation signals. Upon determination that the most recent first pulse width modulation signal is partially generated when the vertical synchronization signal is detected, the first circuit is configured to delay generating the second diving signal at least until the most recent first pulse width modulation signal is fully generated.

In some embodiments, the apparatus further includes a counter configured to count a member of clock signals generated for the most recent first pulse width modulation signal.

In some embodiments, the first circuit is further configured to determine whether a number of clock signals generated for the most recent first pulse width modulation signal when the vertical synchronization signal is detected is less than a first threshold value.

In some embodiments, upon determination that the member of clock signals is less than the first threshold value, the first circuit is further configured to terminate generation of the first driving signal; and generate a second driving signal comprising a plurality of second pulse width modulation signals for a second frame of image. Optionally, the counter is configured to count a member of clock signals generated for the second pulse width modulation signal.

In some embodiment, the first circuit is further configured to determine whether a difference between a number of clock signals generated for the most recent first pulse width modulation signal when the vertical synchronization signal is detected and a target number of clock signals for the most recent first pulse width modulation signal is less than a second threshold value.

In some embodiments, won determination that the difference is less than the second threshold value, the first circuit is further configured to terminate generation of the first driving signal; and generate a second driving signal comprising a plurality of second pulse width modulation signals for a second frame of image. Optionally, the counter is configured to count a number of clock signals generated for a respective second pulse width modulation signal.

In some embodiments, the second threshold value is determined according to:

$$\frac{|Lu(n) - Lu(m)| * f}{|n - m| * Lu(t) * \max\{m, n\}};$$

wherein n stands for a first frame rate of the first frame of image; m stands for a reference frame rate of a reference frame of image; Lu(t) stands for a target luminance value of a respective frame of image; Lu(n) stands for a luminance value of the first frame of image when the vertical synchronization signal is detected; Lu(m) stands for a luminance of the reference frame of image; and f stands for a frequency of clock signals for the plurality of first pulse width modulating signals in the first diving signal.

In some embodiments, the second threshold value is determined according to:

$$\frac{0.01\% * f}{\max\{m, n\}}.$$

In some embodiments, upon determination that the difference is equal to or greater than the second threshold value, the first circuit is further configured to continue generation of the first driving signal, and delay generating the second diving signal until the most recent first pulse width modulation signal is fully generated.

In some embodiment, the apparatus includes one or more processors. A respective processor may include multiple cores for multi-thread or parallel processing. The respective processor may be configured to execute sequences of computer program instructions to perform various processes.

In some embodiments, the apparatus includes one or more storage mediums. A respective storage medium include memory modules, such as ROM, RAM, flash memory modules, and mass storages, such as CD-ROM and hard disk, etc. The respective storage medium may store computer programs for implementing various processes when the computer programs are executed by the one or more processors. For example, the respective storage medium may be configured to store computer programs for implementing various algorithms when the computer programs are executed by the one or more processors.

In some embodiments, the apparatus includes a communication module. The communication module may include certain network interface devices for establishing connections through communication networks, such as TV cable network, wireless network, internet, etc.

In some embodiments, the apparatus includes a database. The database may include one or more databases for storing certain data and for performing certain operations of the stored data, such as database searching.

Figure 13:
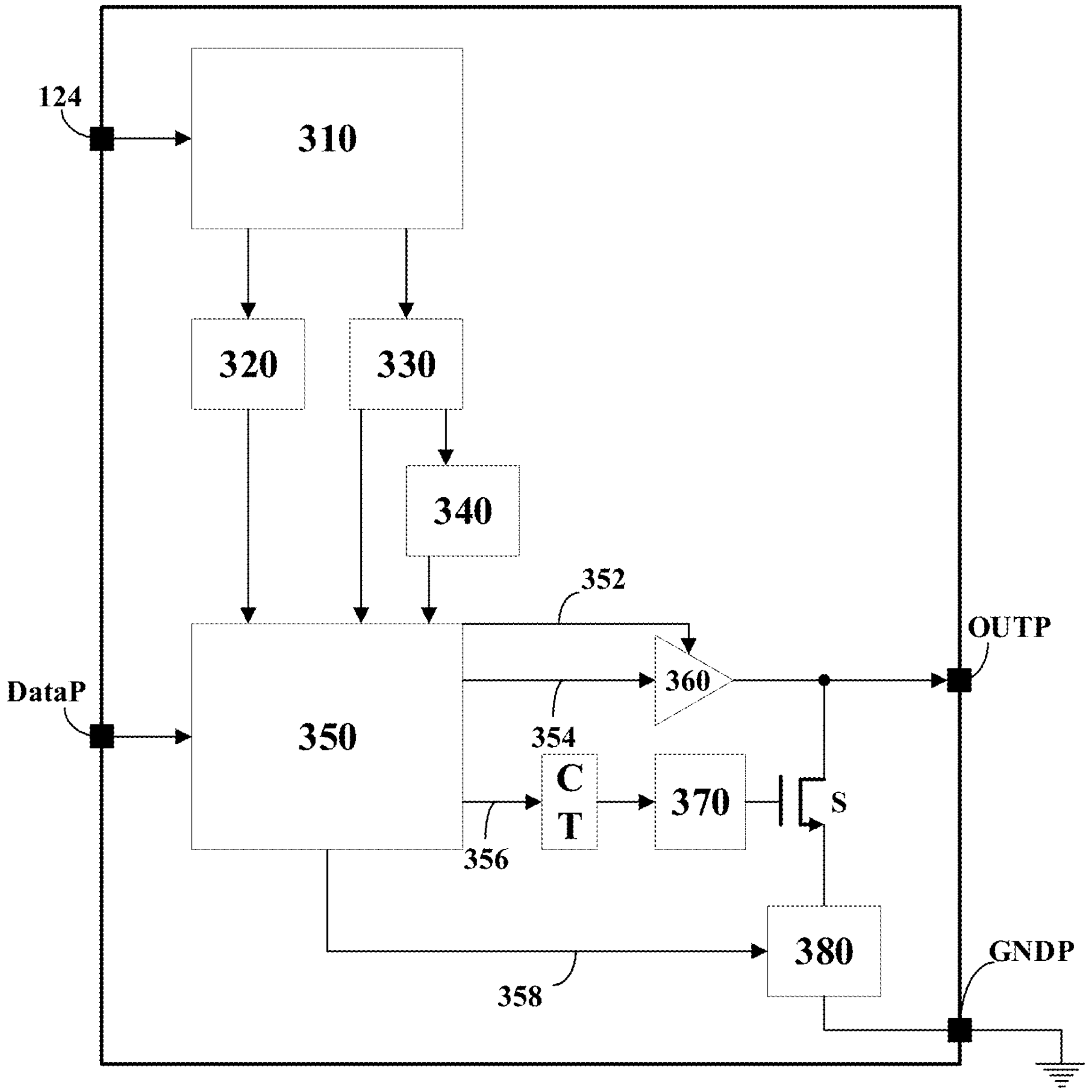
FIG. 13 is a schematic diagram illustrating an apparatus in some embodiments according to the present disclosure.

FIG. 13 is a schematic diagram illustrating an apparatus in some embodiment's according to the present disclosure. Referring to FIG. 13, the apparatus in some embodiments is a driver circuit for a backlight. In some embodiments, the apparatus includes a voltage regulation circuit 310, a Rx_PHY 320, a low dropout voltage regulator 330, an oscillator 340, a control logic 350, an address driver 360, a pulse width modulation circuit 370, a switch S, and a luminance control circuit 380. The driver circuit depicted in FIG. 13 may be a driver circuit connected to a single device cell. One or more or all of the voltage regulation circuit 310, the Rx_PHY 320, the low dropout voltage regulator 330, the oscillator 340, the control logic 350, the address driver 360, and the pulse width modulation circuit 370 may be considered components of the first circuit C1 in FIG. 2.

In some embodiments, the voltage regulation circuit 310 demodulates the power line communication signal received at a power line communication input pin 124 into a supply voltage and digital data. The supply voltage represents the DC component of the power line communication signal, and the digital data represents the modulated component of the power line communication signal. Optionally, the voltage regulation circuit 310 includes a first-order RC filter that follows an active follower. Digital data (e.g., driver control signals) is provided to the Rx_PHY 320. The Rx_PHY 320 is the physical layer that provides the connection between the voltage regulation circuit 310 and the control logic 350. In one example, the Rx_PHY 320 is configured to provide a connection with a maximum bandwidth of 2 MHz with 36 levels of cascading. The supply voltage is provided to the low dropout voltage regulator 330. The low dropout voltage regulator 330 converts the supply voltage into a stable DC voltage (which may be gradually reduced in voltage) for powering the oscillator 340, the control logic 350, and other components. Is one example, the stabilized DC voltage may be 1.8 volts. The oscillator 340 is configured to provide a clock signal. In another example, the maximum frequency of the clock signal is approximated to be 10.7 MHz.

The control logic 350 is configured to receive the driver control signal from the Rx_PHY 320 (replaced with digital data from Di_in), the DC voltage from the low dropout voltage regulator 330, and the clock signal from the oscillator 340. Depending on an operating phase of a backlight, the control logic 350 may also be configured to receive digital data from the incoming addressing signal at a data pin DataP; and the control logic 350 may be configured to output at least one of an enable signal 352, as incremental data signal 354, a PWM clock selection signal 356, or a maximum current signal 358. During aw address configuration phase, the control logic 350 is configured to activate the enable signal 352 so enable address diver 360. The control logic 350 is configured to receive the incoming address signal via the data pin DataP, store the address, and provide the incremental data signal 354 indicating the outgoing address to the address driver 360. Optionally, whew the enable signal 352 is activated during the address configuration phase, the address driver 360 is configured to cache the incremental data signal 334 to the output pin OUTP. The control logic 330 is configured to control the pulse width modulation circuit 370 to turn off the switch S during the address configuration phase to effectively block the current path from the LED.

During a device control phase and a drive configuration phase, the control logic 350 is configured to de-activate the enable signal 352 and the output of address driver 360 is tri-stated to effectively decouple is from output pin OUTP. During the device control phase, the PWM clock selection signal 356 specifies the duty cycle used to control PWM dimming by the pulse width modulation circuit 370. Based on the selected duty cycle, the pulse width modulation circuit 370 is configured to control the timing of the on-state and off-state of the switch S. During the on state of the switch S, a current path is established through the switch S for the output pin OUTP (coupled to a device cell) to the ground pin GNDP, and the luminance control circuit 380 pools the driver current of the LED's passing through the device cell. During the cutoff state of transistor 375, the current path is interrupted to prevent current from flowing through the light emitting region. When the switch S is in the on state, she luminance control circuit 380 is configured to receive the maximum current signal 358 from the control logic 350 and control the current level flowing through a light emitting element (from the output pin OUTP to the ground pin GNDP). During the device control phase, the control logic 350 is configured to control the duty cycle of the pulse width modulation circuit 370 and the maximum current 358 of the brightness control circuit 330 to set the device cell to a desired brightness.

Referring to FIG. 13, the apparatus in some embodiments further includes a counter CT connected to the control logic 350 and connected to the pulse width modulation circuit 370. In some embodiments, the control logic 350 further includes a module for storing the first threshold value and the second threshold value discussed above. The counter CT is configured to receive the first threshold value and the second threshold value via connection with the control logic 350.

In one example as depicted in FIG. 13, the control logic 350 is connected to the data pin DataP, and is configured to receive data signals from the data pin DataP. The data signals received from the data input pin contain signals indicating the beginning of each and every frame of images. The control logic 350 is configured to derive the vertical synchronization signal from the data signals.

In another example, the control logic 350 may be configured to receive the vertical synchronization signal directly. For example, the apparatus in some embodiments may further includes a pin for receiving the vertical synchronization signal, the control logic 350 is connected to the pin, thereby receiving the vertical synchronization signal derived by the control module.

Referring to FIG. 13, the counter CT is connected to the control logic 350, which is configured to receive clock signals from the oscillator 340. The PWM clock selection signal 336 output from the control logic 350 and received by the counter CT is generated based on clock signals, the frequency of which is the same as the frequency of the clock signals from the oscillator 340. In one specific example, the counter CT is configured to count a number of clock signals generated for the most recent first pulse width modulation signal by counting the number of clock signals generated for the PWM clock selection signal 356 output from the control logic 350. In another example, the counter CT may be directly connected to the oscillator 340, and configured to receive clock signals from the oscillator 340; and the counter CT is configured to count a number of clock signals generated for the most recent first pulse with modulation signal by counting the number of clock signals directly from the oscillator 340.

Various appropriate clock signals may be implemented in the present method and apparatus. In one example, the clock signals are square wave signals, and the counter CT is configured to count a number of pulses of the square wave signals, thereby counting she number of the clock signals.

Figure 14:
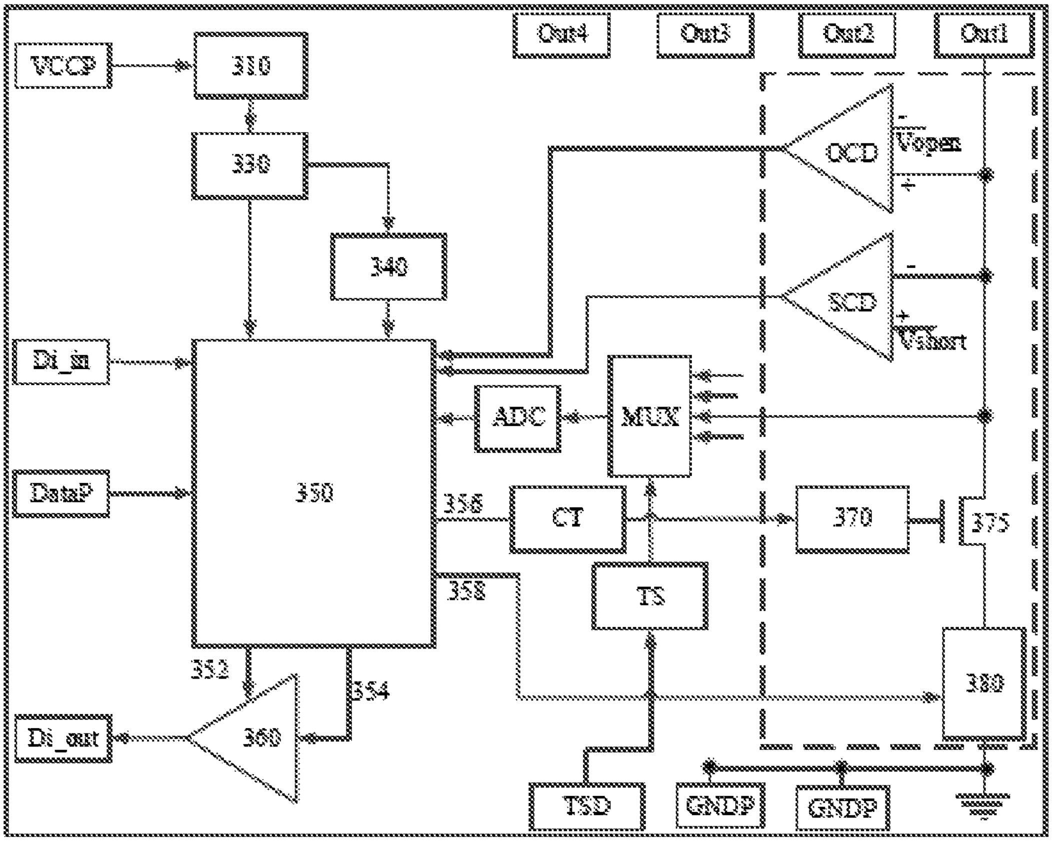
FIG. 14 is a schematic diagram illustrating an apparatus in some embodiments according to the present disclosure.

FIG. 14 is a schematic diagram illustrating an apparatus in some embodiments according to the present disclosure. The driver circuit depicted in FIG. 14 may be a driver circuit connected to multiple device cells (e.g., four device cells). Referring to FIG. 14, the apparatus in some embodiments includes a voltage regulation circuit 310, a low dropout voltage regulator 330, an oscillator 340, a control logic 350, an address driver 360, a pulse width modulation circuit 370, a switch S, and a luminance control circuit 380.

In some embodiments, the voltage regulation circuit 310 is configured to receive a chip supply voltage VCC at a chap power pin VCCP for regulation to obtain the DC component of the chip supply voltage VCC to generate the supply voltage. Optionally, the voltage regulation circuit 310 includes a first-order RC filter following an active follower. The supply voltage is supplied to the low dropout voltage regulator 330. The low dropout voltage regulator 330 is configured to convert the supply voltage to a stable DC voltage (which may be gradually reduced) for powering the oscillator 340 and the control logic 350. In one example, the stabilized DC voltage may be 1.8 volts. The oscillator 340 is configured to provide the clock signal, which may have a maximum frequency of, for example, about 10 MHz.

In some embodiments, the control logic module 350 is configured to receive the drive data Data from a data pox DataP, the DC voltage from the low dropout regulator 330, and the clock signal from the oscillator 340. Depending on an operating phase of a backlight, the control logic 350 is configured to also receive digital data from the address signal received at address pin Di_in; the control logic 350 is configured to output as enable signal 352, an incremental data signal 354, a PWM clock selection signal 356, and a maximum current signal 358. During a address configuration phase, the control logic 350 is configured to activate the enable signal 352 to enable the address driver 360. The control logic 350 is configured to receive the address signal via the address pin Di_in, store the address, and provide the incremental data signal 354 indicating the outgoing address to the address driver 360. When the enable signal 352 is activated during the address configuration phase, the address driver 360 is configured to cache the incremental data signal 354 to a relay pin Di_out. The control logic 350 is configured to control the pulse width modulation circuit 370 to turn off the switch S during the address configuration phase to effectively block the current path from a light emitting element.

During device control and driver configuration phases, the control logic 350 is configured to de-activate the enable signal 352 and the output of address driver 360 is tri-stated to effectively decouple it from the relay pin Di_out. During the device control phase, the PWM clock selection signal 356 is configured to specify the duty cycle used to control PWM dimming by the pulse width modulation circuit 370. Based on the selected duty cycle, the pulse width modulation circuit 370 is configured to control the timing of the on-state and off-state of switch S. During the on state of the switch S, a current path is established through the switch S from an output pin OUTP (coupled to the light emitting element, with Out1 as an example in FIG. 14) to a ground pin GNDP, and the luminance control circuit 350 is configured to collect the current passing through the light emitting elements in a respective device cell. During the cutoff state of the switch S, the current path is interrupted to prevent current flow through the device cell. Whew the switch S is on, the luminance control circuit 380 is configured to receive the maximum current signal 358 from the control logic 350 and control the current level flowing through the light emitting elements in the respective device cell (from output pin OUTP to ground pin GNDP). During the device control phase, the control logic 350 is configured to control the duty cycle of the pulse width modulation circuit 370 and the maximum current 358 of the luminance control circuit 380 to set the LEDs in the respective device cell to the desired brightness.

Referring to FIG. 14, the apparatus in some embodiments further includes a short circuit detector SCD and an open circuit detector OCD, wherein the open circuit detector OCD includes an operational amplifier connected in a visual open circuit mode to detect whether an open circuit occurs between the respective device cell and the driver circuit, wherein the Vopen terminal may be a dangling signal terminal. The short circuit detector SCD includes an operational amplifier connected is a virtual short circuit mode to detect whether a short circuit occurs between the respective device cell and the driver circuit, wherein the potential of Vshort may be the same as the potential of a power supply voltage transmitted by a power supply line.

In some embodiments, the apparatus further includes a data selector MUX and an analog-to-digital converter ADC. The apparatus is configured to transmit electrical signals of multiple signal loops to the data selector MUX through multiple output pins Out when forming a signal loop with a corresponding connected device cell and the power supply line, and pass them sequentially through the analog-to-digital converter ADC is time. The analog-to-digital converter ADC is configured to process the electrical signals sequentially, and transmit them to the control logic 350, and then through the relay pin Di_out (e.g., the electrical signals of multiple signal loops are attached to the incremental data signal 354 in order and according to the coding miles), until they are output by the relay pin Di_out of the driver circuit MIC in the last stage and connected to the external circuit via a feedback line.

Referring to FIG. 14, the apparatus is some embodiments farther includes a Thermal Shutdown Delay Sensor TSD and a Thermal Shutdown Delay Controller TS. The Thermal Shutdown Delay Sensor TSD is configured to detect the interval temperature of the apparatus. When the internal temperature of the apparatus reaches the preset protection temperature (generally set between 150° C. and 170° C.), the thermal shutdown delay controller TS operates to turn off the output of the apparatus to reduce the power consumption of the apparatus and thus the internal temperature of the apparatus. When the internal temperature of the apparatus decreases to the preset restart temperature (restart temperature=protection temperature−delay temperature), the apparatus will output again. Where the delay temperature is generally set in the range of 15 to 30°. The Thermal Shutdown controller TS can be connected to the data selector MUX, which in turn can feed abnormal information to the control logic 350 through the analog-to-digital converter ADC to control the operating state of the apparatus.

Referring to FIG. 14, the apparatus in some embodiments further includes a counter CT connected to the control logic 350 and connected to the pulse width modulation circuit 370. In some embodiments, the control logic 350 further includes a module for storing the first threshold value and the second threshold value discussed above. The counter CT is configured to receive the first threshold value and the second threshold value vis connection with the control logic 350.

Figure 15:
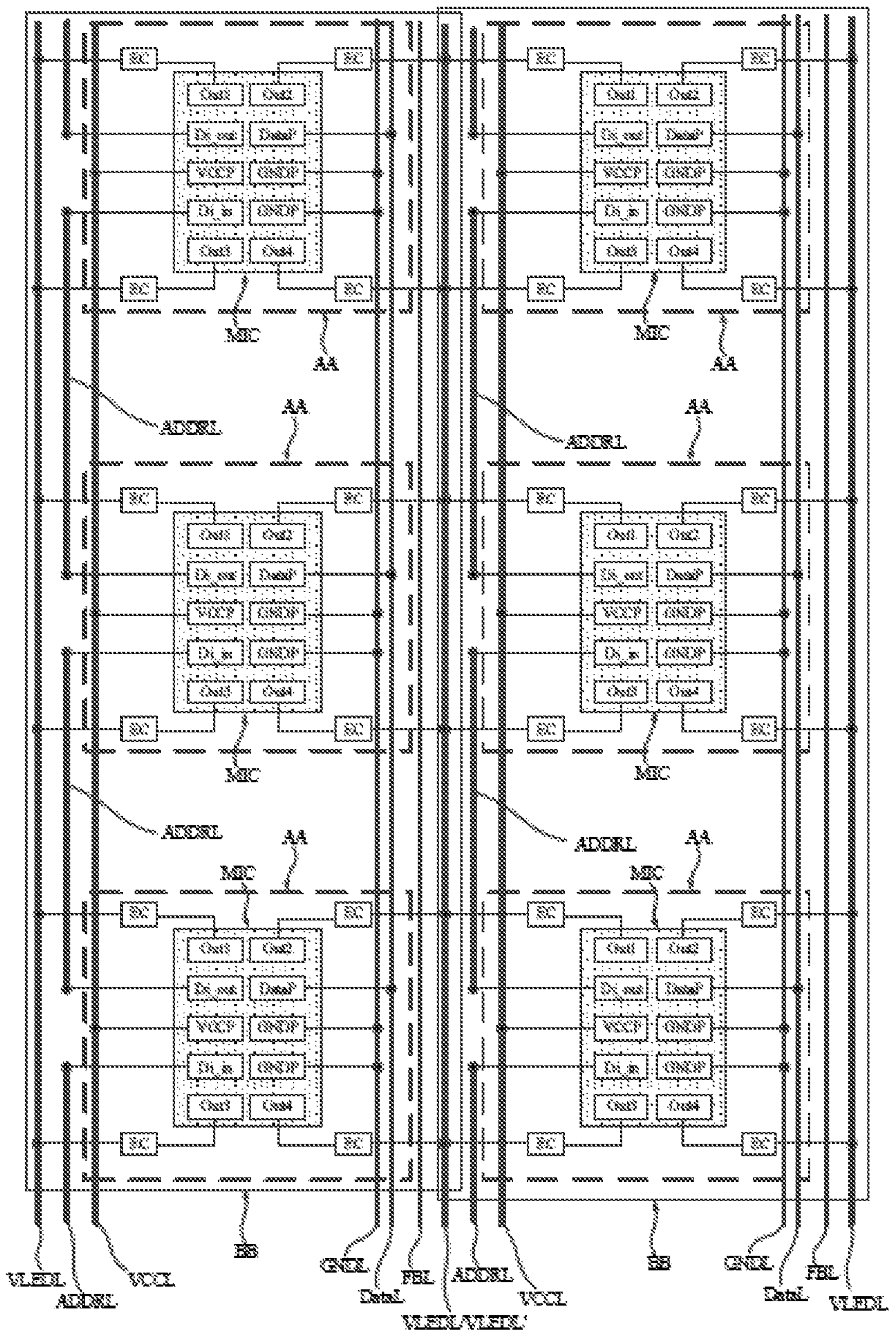
FIG. 15 is a schematic diagram illustrating the structure of a plurality of repeating units in an apparatus in some embodiments according to the present disclosure.

The driver circuit as depicted is FIG. 14 may be a repeating unit of a plurality of repeating units in the apparatus. FIG. 15 is a schematic diagram illustrating the structure of a plurality of repeating units in an apparatus in some embodiments according to the present disclosure. Referring to FIG. 15, the apparatus in some embodiments includes a plurality of device control regions AA provided in an array; within any one device control region AA, the apparatus is provided with a driver circuit MIC and a device cell EC drew by the driver circuit MIC. Back driver circuit corresponds to the driver circuit depicted in FIG. 14.

Figure 16:
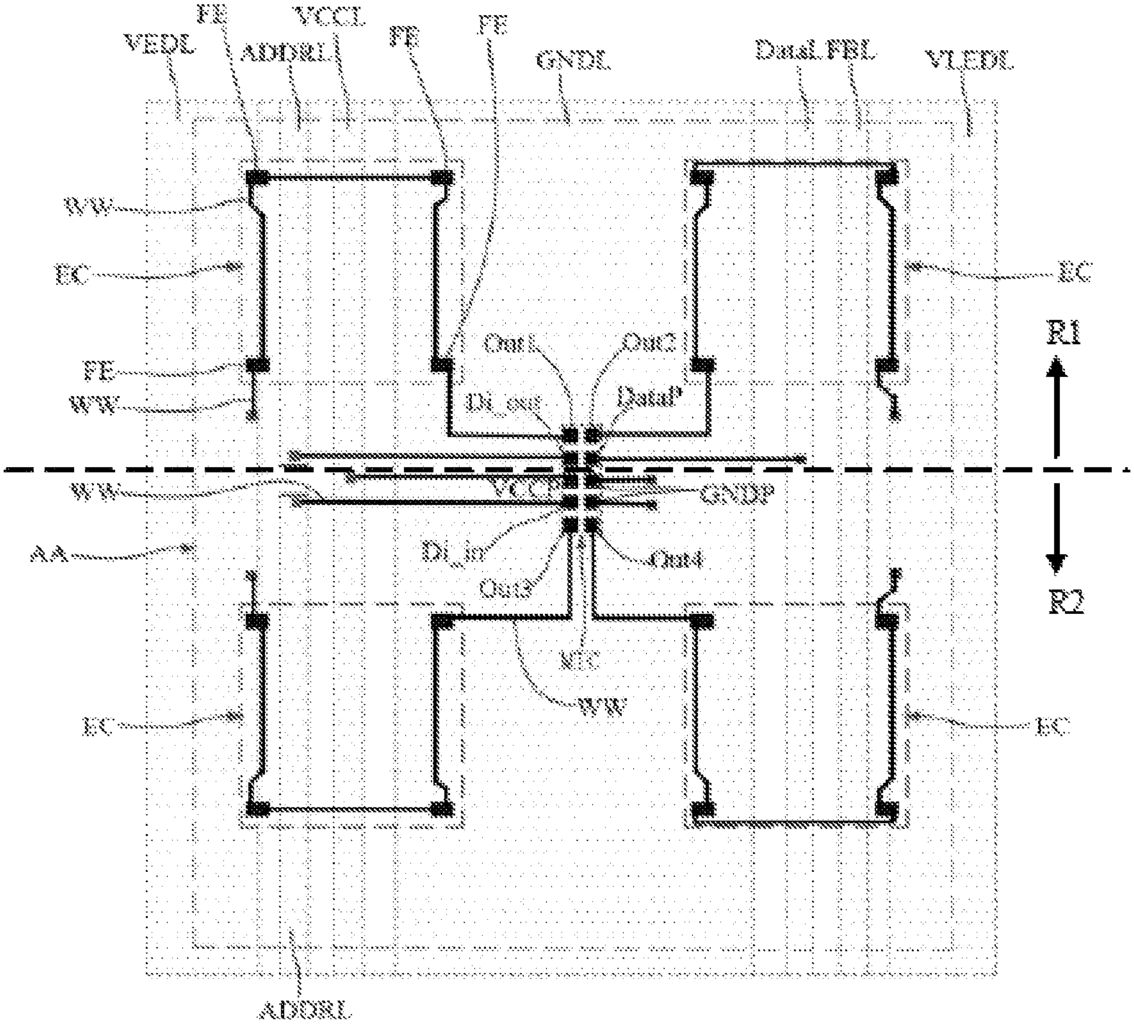
FIG. 16 illustrates the structure of a respective device control region in an apparatus in some embodiments according to the present disclosure.

FIG. 16 illustrates the structure of a respective device control region in an apparatus in some embodiments according to the present disclosure. Referring to FIG. 16, any one device cell EC may include a functional element or a plurality of functional elements FE in which there is an electrical connection relationship. Referring to FIG. 15, the device control area AA is arranged into a plurality of device control area columns BB; any one device control area columns BB includes a plurality of device control areas AA arranged sequentially along the column direction further, in a device control area column BB, individual diver circuit MICs may be arranged linearly along the column direction.

Optionally, in the present disclosure, the driver circuit MIC may be an integrated circuit, and in particular may be a packaged chip with pins.

In the present disclosure, the functional element may be a current-driven electronic element, for example, it may be a beat-generating element, a light-emitting element, as acoustic element, etc., or if may be an electronic element that implements a sensing function, for example, a light-sensitive element, a heat-sensitive element, an acoustic-electric transducer element, etc. Any one device unit EC can include a functional element, but also can include a variety of different electronic components. The number, type, relative position and electrical connection of the functional components included in any two device units EC can be the same or different.

Optionally, at least some of the functional elements in the device unit EC can be light emitting elements, for example, they can be LED's (light emitting diodes), Micro LEDs (micro light emitting diodes), mini LEDs (mist light emitting diodes), OLEDs (organic electroluminescent diodes), QD-OLEDs (quantum dot-organic electroluminescent diodes), QLEDs (quantum dot light emitting diodes), PLED (organic polymer electroluminescent diode), etc. In this implementation, the array substrate can be diver by the driver circuit MIC to emit light, which in turn can be used in display devices, lighting devices, and other devices.

In some implementations, each functional element in the device wait EC is a light-emitting element in a backlight of a display apparatus. Optionally, the display apparatus is a liquid crystal display apparatus, which includes a laminated liquid crystal display module and a backlight. In this implementation, each device suit EC can work independently under the drive of the driver circuit MIC, so that each device unit EC can emit light independently. In this way, the display apparatus can realize local dimming (local dimming), realize HDR (High-Dynamic Range) effect, and improve the display quality of the display apparatus. The number of functional elements and the electrical connection method are the same in any one device smit EC. In this way, the uniformity of the distribution of light-emitting elements on the backlight caw be ensured, which is conducive to improving the uniformity of light emission from the array substrate and reducing the difficulty of backlight module debugging.

In some embodiments, the display apparatus is a micro LED display apparatus. Is this case, the light-emitting element (e.g., Micro LED, LED, etc.), which is a functional element, can emit light to directly display an image. In one implementation, the light-emitting element can be a light-emitting element capable of emitting light of the same color, such as a blue LED, a red LED, a green LED, or a yellow LED. In this way, the display apparatus can be a monochromatic display device, which can be an instrument dial, a signal indication screen, and other display apparatuses. In some embodiments, the light-emitting elements caw include a variety of different colors of light-emitting elements, such as red LED, green LED, blue LED, yellow LED and so on at least two, and the different colors of light-emitting elements can be controlled independently of each other. In this way, the display apparatus can be mixed by the light and color display.

In some embodiment, is at least part of the area of the apparatus, the driver circuits are arranged in an away. In this way, the difficulty of designing and preparing the apparatus can be reduced, and the difficulty of debugging the apparatus can be reduced, and the cost of the apparatus and the display apparatus can be reduced. In some implementations, on the apparatus, the driver circuits are arranged in an array. Optionally, the relative positions of the individual driver circuit MIC with respect to the device unit EC that they drive, may be we same. In some other implementations, see FIG. 16, the array substrate may include a first region R1 and a second region R2 adjacent to each other, whereas the individual driver circuit MICs located in the fast region are arrayed; the driver circuit MICs located in the second region are arrayed; and the driver circuit MICs are wot arrayed in the first region and the second region as a whole. Further, the relative positions of the driver circuit MICs in the first region R1 with respect to the device cell ECs that they dive may be different from the relative positions of the driver circuit MICs in the second region R2 with respect to the device cell ECs that they drive. Further, the array substrate has a binding area, and the binding area is provided with circuit board binding pads for binding connections to external circuits (e.g., circuit boards, flexible circuit boards, overlay films, etc.). The second area can be located at owe end of the array substrate near the binding area, and the first area can be located on the side of the second area away from the binding area.

Figure 17:
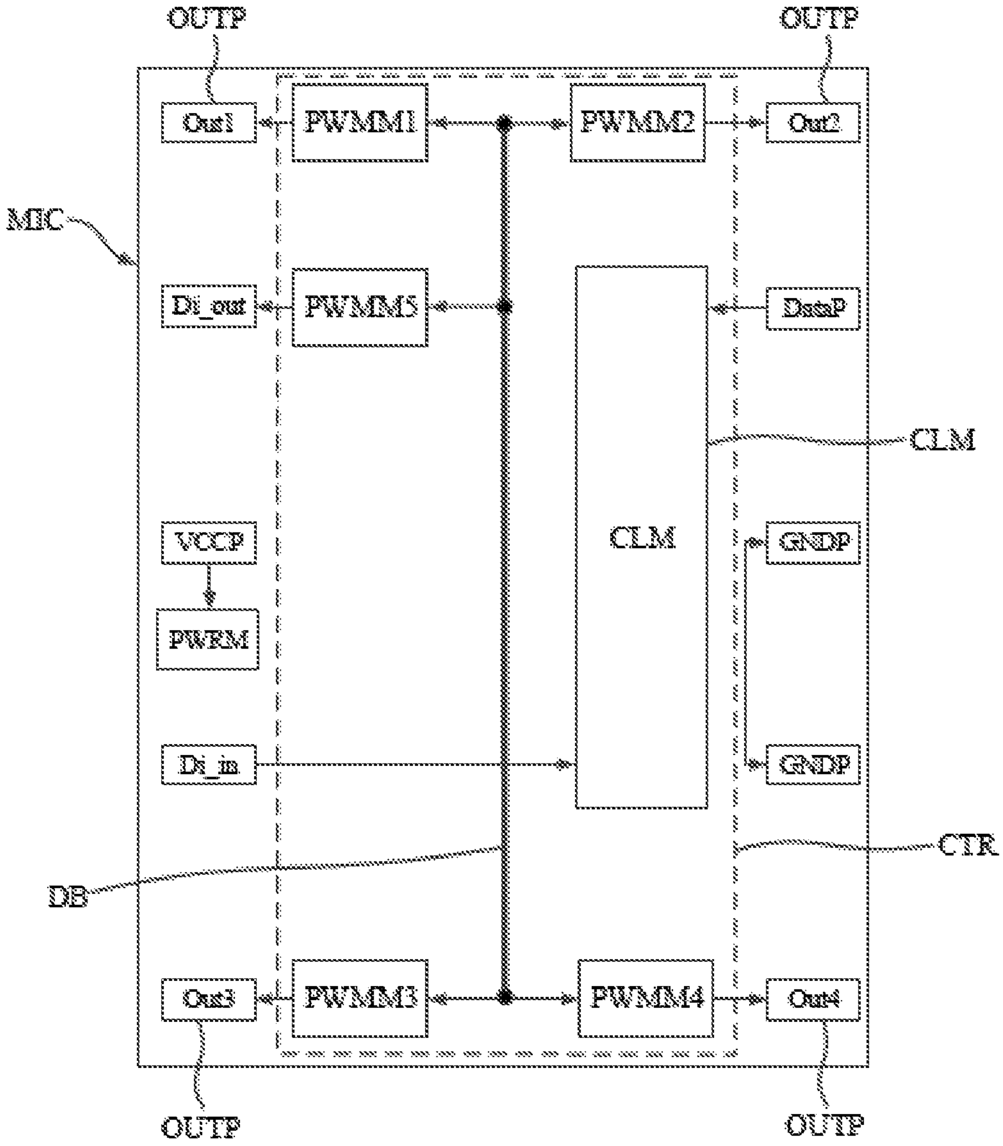
FIG. 17 illustrates the structure of a respective driver circuit in an apparatus us some embodiments according to the present disclosure.

FIG. 17 illustrates the structure of a respective driver circuit in an apparatus in souse embodiments according to the present disclosure. Referring to FIG. 3, the driver circuit MIC provided in the present disclosure includes a logic control module CTR, a data pin DataP and at least two output pins OUTP, the data pin DataP is configured to receive the drive data Data; the logic control module CTR is configured to generate a drive control signal corresponding to each output pin OUTP one by one according to the drive data Data, and the drive control signal is configured to control the current flowing through the corresponding output pin OUTP. Referring to FIG. 15 and FIG. 17, in any of the device control areas AA, the device cells are set in one-to-one correspondence with the respective output pins OUTP of the driver circuit MIC. Optionally, each device cell EC is set one to one with each output pin OUTP.

In this way, the driver circuit MIC can be driven by the following driving method: In the device control stage, the drive data Data is received, and a drive control signal corresponding to each output pin OUTP is generated based on the drive data Data, and the drive control signal is used to control the current flowing through the corresponding output pin OUTP.

In the present diving method, the logic control module CTR of the driver circuit MIC can control the current flowing through the output pin OUTP according to the driving data Data, and than control the driving current flowing through the device cell EC electrically connected to the output pix OUTP, and realize the control and driving of the device cell EC. The driver circuit MIC of the present disclosure can drive at least two device cell ECs at the same time, thus reducing the number of driver circuit MICs in the apparatus and reducing the manufacturing cost. When there are multiple driver circuits arranged is an array, multiple driver circuits can simultaneously provide chive signals to multiple device cells connected to them, i.e., allowing multiple device cells driven by different driver circuits to work simultaneously. It is understood that the "simultaneous driving" and "simultaneous operation" referred to in the present disclosure can be sequential in the order of nanoseconds in time in order to ensure the stability of the driver circuits and to extend the service life of the driver circuits.

In some embodiment, referring to FIG. 17, a driver circuit MIC is provided with four output pins OUTP, i.e., a fast output pin Out1, a second output pin Out2, a third output pin Out3, and a fourth output pin Out4. In this way, the driver circuit MIC of the present disclosure can drive four device cell ECs at the same time. Compared to the implementation of one diver circuit MIC driving one device cell EC, the number of driver circuit MICs can be reduced to ¼, which greatly reduces the amount of driver circuit MICs and thus reduces the manufacturing cost.

Referring to FIG. 15, in any of the device control area columns BB, the array substrate is provided with a power supply line VLEDL and a data supply line DataL extending in the column direction; one end of the device cell EC is eclectically connected to the power supply line VLEDL and the other end is electrically connected to the corresponding output pin OUTP (e.g., any one of Out1 to Out4); the data pin DataP is electrically connected to the data supply line DataL.

In some embodiments, referring to FIG. 17, the logic control module CTR may include the control module CLM and modulation modules (e.g., PWMM1 to PWMM4 in FIG. 17) set one-to-one with each output pin OUTP. Each modulation module is electrically connected to the corresponding output pin OUTP. The control module CLM is configured to generate a drive control signal corresponding to each modulation module based on the drive data Data, and the drive control signal is used to control the on or off of the corresponding modulation module, which in turn controls the electrical path or electrical disconnection before the output pin OUTP and the ground voltage line GNDL, thus realizing the control of the device snit EC. In some embodiments, the drive control signal can control the modulation module so that the signal flowing through the modulation module (and the output pin OUTP and the device wait EC connected to the modulation module) is a pulse width modulation signal. The drive control signal can be used to modulate the pulse width modulation signal, such as adjusting the duty cycle of the pulse width modulation signal and other factors, and then control the average current flowing through the output pins OUTP and EC.

In one example, referring to FIG. 15 and FIG. 17, the driver circuit MIC includes four output pins OUTP, the first output pin Out1 to the fourth output pin Out4, respectively, the logic control module CTR includes four modulation modules, namely the first modulation module PWMM1, the second modulation module PWMM2, the word modulation module PWMM3, the fourth modulation module PWMM4. The first output pin Out1 to the fourth output pin Out4 are connected to the first modulation module PWMM1 to the fourth modulation module PWMM4 one by one. The control module CLM is used to generate the first drive control signal, the second drive control signal, the hard drive control signal and the fourth drive control signal according to the drive data Data, and transmit them to the first modulation module PWMM1, the second modulation module PWMM2, the third modulation module PWMM3 and the fourth modulation module PWMM4 respectively.

In some embodiments, the first modulation module PWMM1 is electrically connected to the first output pin Out1 and is capable of conducting or disconnecting under the control of a fast drive control signal, causing the first output pin Out1 to conduct or disconnect from the ground voltage line GNDL. When the first modulation module PWMM1 is on, the ground voltage line GNDL, the first output pin Out1, the device unit EC electrically connected to the fast output pin Out1 and the device power line VLEDL form a signal loop and the device with EC works. When the first modulation module PWMM1 is off, the above signal loop is broken and the device with EC does not work. In this way, the first modulation module PWMM1 can modulate the current flowing through the device cell EC under the control of the first drive control signal, so that the current flowing through the device cell EC is presented as a pulse width modulation signal. The first modulation module PWMM1 car modulate factors such as the duty cycle of the pulse width modulation signal flowing through the device wait EC according to the first drive control signal, and then control the operating state of the device unit EC. When the device unit EC contains LEDs, by increasing the duty cycle of the pulse widths, modulation signal, the total luminous duration of the LED's in a display frame can be increased, thereby increasing the total luminous brightness of the LEDs in the display frame and increasing the luminous intensity in the region Conversely, by decreasing the duty cycle of the pulse width modulation signal, the total luminous duration of the LEDs is a display frame caw be decreased, thereby decreasing the luminous intensity of the LEDs in the display frame, which is turn reduces the total luminance of the LEDs is the display frame, making the luminance is the region reduced.

In some embodiments, the second modulation module PWMM2 is electrically connected to the second output pin Out2 and can be turned on or off under the control of the second drive control signal, so what the current flowing through the device cell EC connected to the second output pin Out2 is a pulse width modulation signal. The third modulation module PWMM3 is electrically converted to the third output pin Out3 and can be turned on or off under the control of the third drive control signal, so that the current flowing through the device suit EC connected to the third output pin Out3 is a pulse width modulation signal. The fourth modulation module PWMM4 is electrically connected to the fourth output pin Out4 and caw be turned on or off under the control of the fourth drive control signal, so that the current flowing through the device unit EC connected to the fourth output pin Out4 is a pulse widths modulation signal.

In some embodiments, the first modulation module PWMM1 to the fourth modulation module PWMM4 can be switching elements, for example, MOS (metal-oxide-semiconductor field-effect transistor), TFT (thin film transistor) and other transistors. Optionally, the first drive control signal to the forth drive control signal can be pulse width modulation signals, and the switching elements are controlled to be turned on or turned off by the pulse width modulation signals.

In some embodiments, referring to FIG. 17, the first modulation module PWMM1 to the fourth modulation module PWMM4 can be electrically connected to the control module CLM through the data bus DB, or can be electrically connected to the control module through the data live respectively, or electrically connected to the control module by other means, without any particular levitation in this disclosure.

In some embodiments, the control module CLM may include a data link layer and a control logic. The data link layer is configured to be electrically connected to a circuit/module or structure other than the control module CLM, such as for electrically connecting to the address pin Di_in, the data pin DataP, and the data bus DB. The control logic is configured to receive external signals (e.g., address signals from data pin DataP, drive data from data pin DataP) through the data link layer, and to generate drive control signals (e.g., output the first drive control signal to the fifth drive control signal) and output them through the data link layer.

In some embodiments, the drive data Data includes address information and drive information. The logic control module CTR is further configured to obtain the drive information of the drive data Data when the address information of the drive data Data matches the address information of the drive circuit MIC, and generate a dive control signal based on the drive information of de drive data Data.

In some embodiments, de driving method of the driver circuit MIC may further include at the address configuration stage, receiving an address signal, configuring address information of the driver circuit MIC based on the address signal, and generating and outputting a relay signal. The relay signal is capable of serving as an address signal of the succeeding driver circuit MIC. In the device control stage, generating a drive control signal corresponding to each output pin OUTP one by one according to the drive data Data can be achieved by: obtaining drive information of the drive data Data when the address information of the drive data Data watches the address information of the drive circuit MIC, and generating a drive control signal according to the drive information of the drive data Data.

In some embodiments, an encoder may be provided on the external circuitry (e.g., a circuit board) and a decoder may be provided on the logic control module CTR. The encoder caw encode the drive data according to 4b/5b encoding protocol, 8b/10b encoding protocol, or other encoding protocols to generate the drive data Data and transmit it to the data supply line DataL. The decoder of the logic control module CTR can decode the drive data Data to obtain the address information and drive information in the drive data Data.

In some embodiments, reforming to FIG. 15, the data pins DataP of multiple driver circuits can be connected to the same data supply line DataL. The data supply lie DataL can be loaded with a plurality of different drive data Data, and each driver circuit MIC can determine the corresponding dive data Data based on the configured address information, and drive the respective connected device cell EC based on the respective corresponding drive data Data. In some embodiments, the driver circuit MIC is configured to receive the drive data data through the data pin DataP, and the apparatus can transmit the drive data through the drive data line DataL, thus avoiding the use of SPI (Serial Peripheral interface) for data transmission. Therefore, it is possible to simplify the structure of the apparatus, external circuitry and driver circuitry MIC and reduce the manufacturing cost by obviating the issue of too many pads and signal lines due to the use of SPI (Serial Peripheral interface) for data transmission. In some embodiment, referring to FIG. 15, a driver circuit MIC and a data supply line DataL are provided in a device control area columns BB, and the data pins DataP of each driver circuit MIC are connected to the data supply line DataL.

In some embodiments, referring to FIG. 15 and FIG. 17, the driver circuit MIC may also include an address pin Di_in and a relay pin Di_out, wherein the address pin Di_in is configured to receive an address signal. The logic control module CTR is further configured to configure the address information of the driver circuit MIC based on the address signal and generate a relay signal. The relay signal is configured to serve as a relay signal for the succeeding driver circuit MIC's address signal. The relay pin Di_out is configured to output the relay signal. In the present disclosure, whew the driver circuit MICs are cascaded, the next stage driver circuit is the successor driver circuit of the previous level driver circuit MIC. In this way, when multiple driver circuits are cascaded is sequence, the upper level driver circuit can configure address information for the lower level driver circuit based on its own address information, whereby enabling dynamic address assignment to the cascaded driver circuits.

In some embodiments, referring to FIG. 17, the logic control module CTR may also include a fifth modulation module PWMM5, which is electrically connected to the relay pin Di_out. The control module CLM can receive aw address signal from the address pin Di_in and generate and transmit a relay control signal to the fifth modulation module PWMM5 based on the address signal. The fifth modulation module PWMM5 can generate a relay signal in response to the relay control signal and load it to the relay pin Di_out.

In some embodiments, the fifth modulation module PWMM5 can be eclectically connected to the control module CLM via data bus DB, or electrically connected to the control module vis a dedicated data line, or electrically connected to the control module by other means, without any special limitation in this disclosure.

In one example, the driver circuit MIC further includes a data bus DB. Optionally, the first modulation module PWMM1 to the fifth modulation module PWMM5, and the control module CLM are all connected to the data bus DB, which in turn enables the control module CLM to interact with the first modulation module PWMM1 to the fifth modulation module PWMM5.

In some embodiments, the fifth modulation module PWMM5 may include a switching element, which may include, for example, a transistor such as MOS (metal oxide-semiconductor field effect transistor), TFT (thin-film transistor), etc. The relay control signal may be a pulse width modulation signal, and the switching element connects or disconnects under the control of the pulse width modulation signal Whew the switching element is turned on, the fifth modulation module PWMM5 can output current or voltage. When the switching element is turned off, the fifth modulation module PWMM5 cannot output current or voltage. In this way, the fifth modulation module PWMM5 can modulate a pulse width modulation signal as a relay signal.

In some embodiments, referring to FIG. 15, each driver circuit MIC located in the same device control area column BB is sequentially cascaded. In any of the device control area column BB, the apparatus is provided with a plurality of address lines ADDRIs corresponding to each driver circuit MIC, and each address line extends along the column direction. The address pins Di_in of the driver circuit MICs are electrically connected to the corresponding address line ADDRL. The relay pin Di_out of the upper level driver circuit MIC is electrically connected to the corresponding address line ADDRL of the lower level driver circuit MIC. In this way, in this device control area column BB, the cascaded driver circuit MICs can be electrically connected to each other via the address line ADDRL. The relay signal of the upper level driver circuit MIC can be loaded to the corresponding address line ADDRL of the lower level driver circuit MIC and used as the address signal of the lower level driver circuit MIC. Further, an external circuit can load an address signal to the address line ADDRL corresponding to the first level driver circuit MIC.

In some embodiment, referring to FIG. 15, in any one of the device control area columns BB, the extensions of the plurality of address lives ADDRL are is the same direction. In other words, the address lines ADDRLs may be co-linear. Is this way, in the line direction, each address line ADDRL can occupy the width of only one address line ADDRL, obviating the issue that the address live ADDRL occupying too much wiring space in the line direction. This is conducive to an increase of the width of the device power line VLEDL, ground voltage line GNDL and other lines to reduce the square resistance of these lines.

In some embodiments, referring to FIG. 15, the apparatus is further provided with a feedback line FBL in at least one device control area column BB. In a sequentially cascaded plurality of driver circuits, a relay pin Di_out of the last level of the driver circuit MIC may be connected to the feedback line FBL.

In some embodiment, the apparatus may include a plurality of signal channels, each signal channel including a device control area column BB or a plurality of sequentially adjacent device control area columns BB. Within a signal channel, the driver circuits are sequentially cascaded. Within any one signal channel, the apparatus may be provided with at least que feedback ling FBL such that a relay pin Di_out of the last stage driver circuit MIC within that signal channel is eclectically connected to the feedback line FBL. In one example as depicted in FIG. 15, s signal channel includes a device control area columns BB. Is another example, each of the device control area columns BB has a feedback line FBL. Optionally, in the device control area column BB, the feedback line FBL is located between the ground voltage line GNDL and the power supply line VLEDL.

In some embodiments, referring to FIG. 15 and FIG. 17, the driver circuit MIC further includes a chip power pin VCCP. The chip power pin VCCP is configured to load the chip power voltage VCC for driving the operation of the driver circuit MIC to the driver circuit MIC. Optionally, the driver circuit MIC may father include a power supply module PWRM, and the chip power pin VCCP may load the chip power voltage VCC to the power supply module PWRM, which is configured to provide power supply to the driver circuit MIC.

Referring to FIG. 15, in the device control area column BB, the apparatus may be provided with a chip power line VCCL extending along the column direction, and external circuitry may load the chip power supply voltage VCC to the driver circuit MIC through the chip power line VCCL. Optionally, referring to FIG. 15, the chip power line VCCL is located between the device power line VLEDL and the ground voltage line GNDL.

Figure 18:
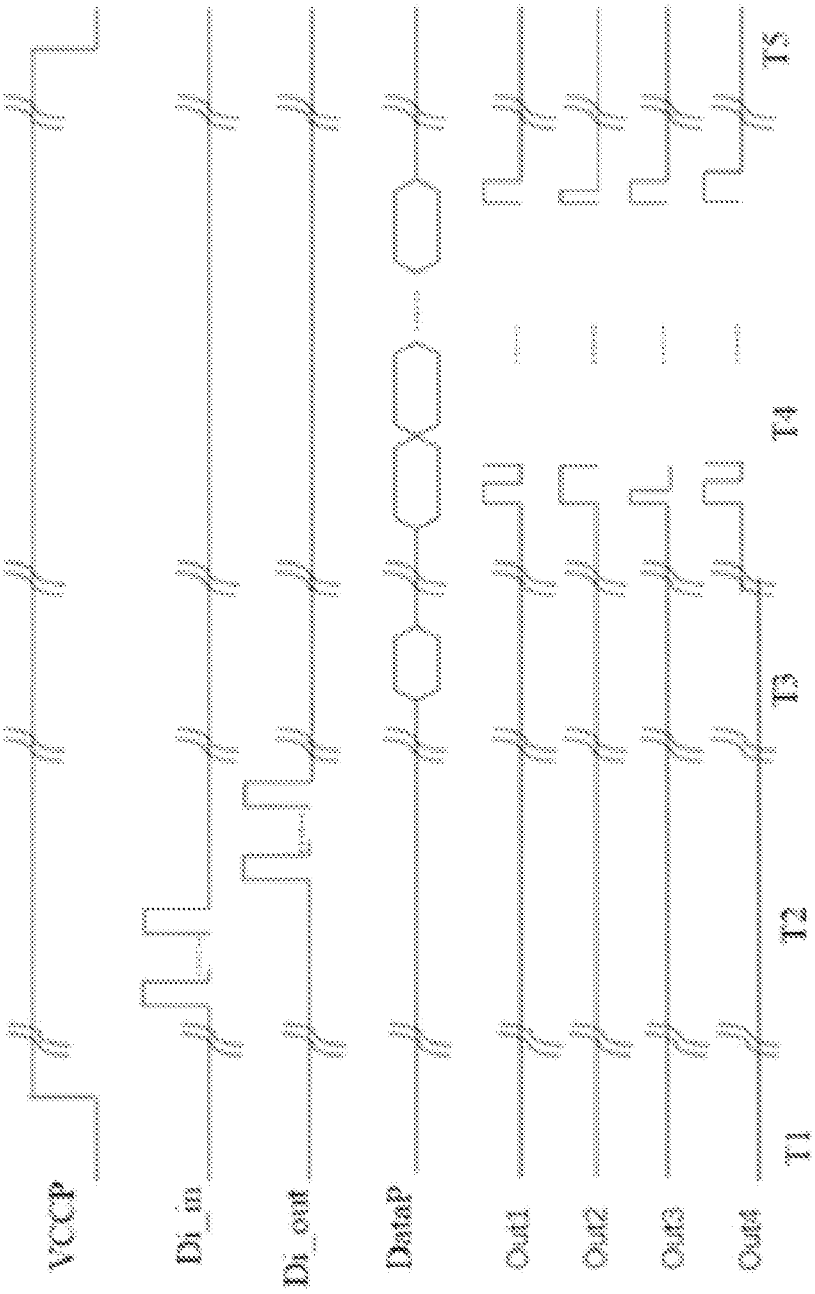
FIG. 18 is a timing diagram of a driver circuit in one embodiment of the present disclosure.
Figure 19:
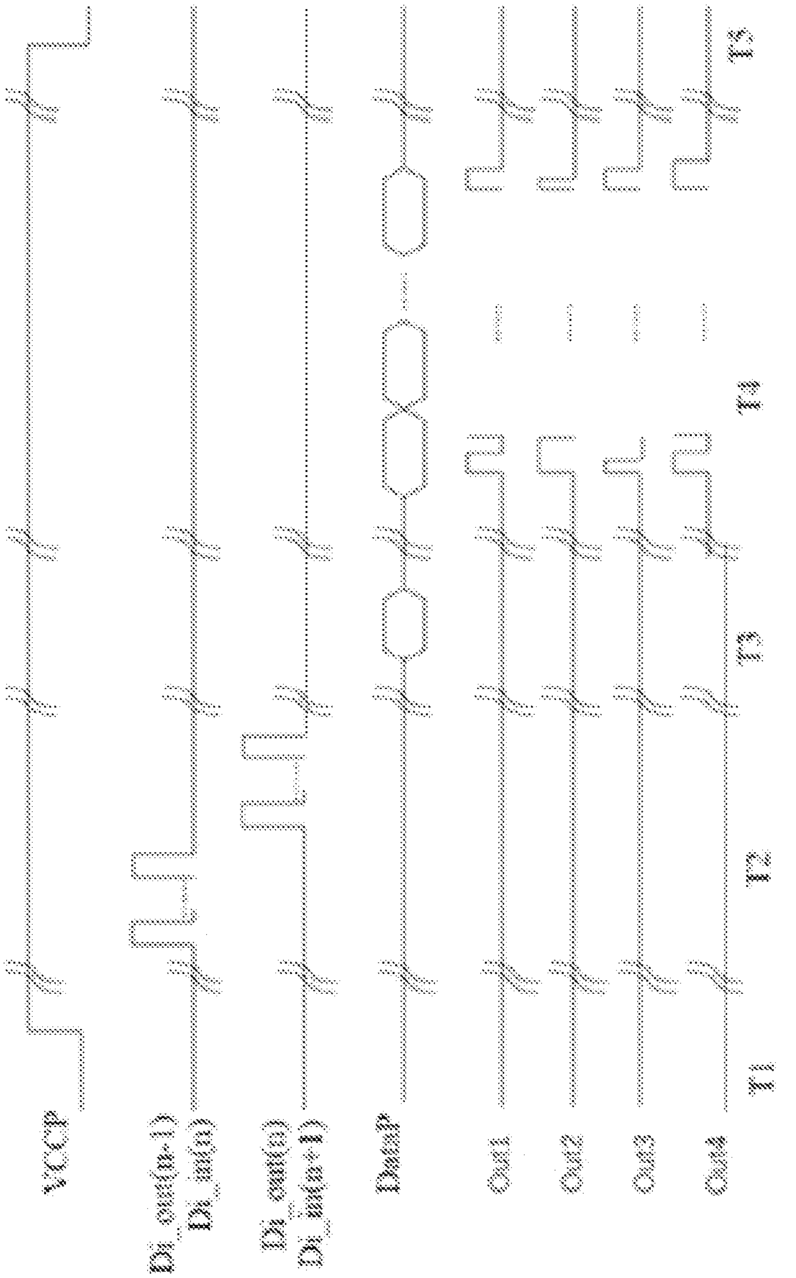
FIG. 19 is a timing diagram of a cascaded driver circuit in one embodiment of the present disclosure.

FIG. 18 is a timing diagram of a driver circuit in one embodiment of the present disclosure. FIG. 19 is a timing diagram of a cascaded driver circuit in one embodiment of the present disclosure. Referring to FIG. 18 and FIG. 19, the driver circuit MIC can drive the device cell EC connected to the driver circuit MIC by a driving method below.

In a power-up phase T1, the chip power supply voltage VCC is received. The external circuitry may load the chip power supply voltage VCC to the chip power line VCCL, and the chip power supply voltage VCC may be loaded to the driver circuit MIC via the chip power pin VCCP to supply power to the driver circuit MIC. In this way, the driver circuit MIC is in a powered-up state.

Optionally, when a display apparatus is in operation, the external circuit can load the chip power supply voltage VCC to each chip power supply line VCCL at the same time, which in turn causes each driver circuit MIC to be powered up at the same time.

Optionally, when the display apparatus is powered ax and external circuitry (such as the board driving the array substrate) is powered up, the external circuitry can load the chip power supply voltage VCC to the chip power supply line VCCL, thereby synchronizing the power-up of the driver circuit MIC with the power-up of the display apparatus.

In an address configuration phase T2, the address signal is received, the address information of the driver circuit MIC is configured based on the address signal, and the relay signal is generated and output. The relay signal can be used as an address signal for the next stage of the driver circuit MIC (i.e., the succeeding driver circuit MIC). The driver circuit MIC can receive, inter alia, the address signal on the connected address line ADDRL via the address pin Di_in. When the address line ADDRL is electrically connected to an external circuit, the address signal may be an address signal loaded to the address sine ADDRL by the external circuit. When the address line ADDRL is electrically connected to an upper stage driver circuit MIC, the address signal on the address line ADDRL may be a relay signal output by the upper stage driver circuit MIC. Optionally, the driver circuit MIC can output the relay signal through the relay pin Di_out.

In one example as depicted in FIG. 19, in a cascaded driver circuit MIC, Di_out (n−1) is the relay pin Di_out of the (n−1)th stage diver circuit MIC; Di_in (n) is the address pin Di_in of the n-th stage driver circuit MIC; Di_out (n) is the relay pin Di_out of the n-th stage driver circuit MIC; Di_in (n+1) is the address pin Di_in of the driver circuit MIC of the (n+1)-th stage. Referring to FIG. 19, in the address configuration phase T2, the same signal is loaded on Di_out (n−1) and Di_in (n), i.e., the relay signal output from the driver circuit MIC of the (n−1)-th stage is used as the address signal of the driver circuit MIC of the n-th stage; Di_out (n) and Di_in (n+1) are loaded with the same signal, i.e., the relay signal output from the n-th stage driver circuit MIC is used as the address signal of the (n+1)-th stage driver circuit MIC. In this example, $2 \leq n \leq N-1$; where a is a positive integer and N is the total number of multiple driver circuit MICs with a cascade relationship.

In the address configuration phase T2, among the plurality of drive circuit MICs that are sequentially cascaded, an external circuit may load an address signal to the first stage drive circuit MIC to cause the first stage drive circuit MIC to configure address information. Subsequently, the upper stage drive circuit MIC outputs a relay signal as an address signal to the next stage drive circuit MIC to cause the next stage drive circuit MIC to configure address information until the last driver circuit MIC configures the address information, so as to realize configuring address information for each driver circuit MIC.

In a drive configuration phase T3, the drive configuration signal is received and the drive circuit MIC is initially configured according to the drive configuration signal. Therein, the external circuit can load the drive configuration signal to the drive data line DataL, and the drive circuit MIC can load this drive configuration signal vis the data pin DataP.

Optionally, the driver circuits connected to the same data supply line DataL may receive the drive configuration signals and perform the initialization configuration at the same time.

Optionally, the external circuit may load drive configuration signals to each data supply line DataL at the same time to enable each drive circuit MIC to receive drive configuration signals and complete initialization configuration at the same time, reducing the time for initialization configuration of the drive circuit MICs.

In a device control stage T4, the drive data Data is received, and a drive control signal corresponding to each output pin OUTP is generated based on the drive data Data, and the drive control signal is used to control the current flowing through the corresponding output pin OUTP. In this way, the diver circuit MIC can control the current flowing through the device cell EC under the action of the device power supply voltage VLED loaded ow the device power supply line VLEDL, and achieve the purpose of driving each device cell EC connected according to the drive data Data. In the device control stage T4, the external circuit can load the drive data Data to the data supply line DataL, and the driver circuit MIC receives the drive data Data via the data pin DataP.

In some embodiments, the drive data Data includes address information and drive information. When the address information of the drive data Data matches the address information of the driver circuit MIC, the drive information of the drive data Data is acquired, and a drive control signal is generated based on the drive information of the drive data Data.

In a power-down phase T5, the driver circuit MIC is in a power-down state and does not operate. Optionally, the chip power supply voltage VCC may not be loaded to the chip power supply lice VCCL, which in turn leaves the driver circuit MIC in the down power state. Optionally, when the external circuitry driving the apparatus is powered down, the driver circuit IC is powered down. In other words, when the display apparatus is turned off, the driver circuit IC can be powered down and be in the power-down stage.

In another aspect, the present disclosure provides a backlight. In some embodiment's the backlight includes the apparatus described herein, and a light source connected to the modulation controller. Examples of light sources include a mini light emitting diode, a micro light emitting diode, and an organic light emitting diode.

In another aspect, the present disclosure provides a display apparatus. In some embodiments, the display apparatus includes a display panel, and the backlight described herein. Examples of appropriate display apparatuses include, but are not limited to, an electronic paper; s mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled is this at. The embodiments are choses and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature wireless specific number has been given. Amy advantages and benefits described may not apply to all embodiments of the invention. It should be appreciated that variations may be made is the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for generating driving signal, comprising:

generating, by a first circuit, a first driving signal for a first frame of image, the first driving signal comprising a plurality of first pulse width modulation signals, each of the plurality of first pulse width modulation signals configured to have a uniform duration, transmitting the plurality of first pulse width modulation signals to a modulation controller;

detecting a vertical synchronization signal;

determining whether a most recent first pulse width modulation signal is partially generated, wherein the most recent first pulse width modulation signal is partially generated if a duration of the most recent first pulse width modulation generated at time when the vertical synchronization signal is detected is less than the uniform duration;

in response to determining the most recent first pulse width modulation signal is partially generated, perform, based on a comparison of the duration of the most recent first pulse width modulation generated with at least one threshold, either one of:

continue generation of the first driving signal, and delay generating of a second driving signal until the most recent first pulse width modulation signal is fully generated;

or terminate generation of the first driving signal; and generate the second driving signal comprising a plurality of second pulse width modulation signals for the second frame of image.

2. The method of claim 1, further comprising counting a number of clock signals generated for the most recent first pulse width modulation signal.

3. The method of claim 2, further comprising determining whether a number of clock signals generated for the most recent first pulse width modulation signal when the vertical synchronization signal is detected is less than a first threshold value.

4. The method of claim 3, upon determination that the number of clock signals is less than the first threshold value, further comprising:

terminating generation of the first driving signal; and generating the second driving signal comprising a plurality of second pulse width modulation signals for the second frame of image.

5. The method of claim 2, further comprising determining whether a difference between a number of clock signals generated for the most recent first pulse width modulation signal when the vertical synchronization signal is detected and a target number of clock signals for the most recent first pulse width modulation signal is less than a second threshold value.

6. The method of claim 5, wherein terminating generation of the first driving signal; and generating the second driving signal comprising a plurality of second pulse width modulation signals for the second frame of image are performed upon determination that the difference is less than the second threshold value.

7. The method of claim 5, wherein the second threshold value is determined according to:

$$\frac{|Lu(n)-Lu(m)|*f}{|n-m|*Lu(t)*\max\{m,n\}};$$

wherein n stands for a first frame rate of the first frame of image; m stands for a reference frame rate of a reference frame of image; Lu (t) stands for a target luminance value of a respective frame of image; Lu (n) stands for a luminance value of the first frame of image when the vertical synchronization signal is detected; Lu (m) stands for a luminance of the reference frame of image; and f stands for a frequency of clock signals for the plurality of first pulse width modulation signals of the first driving signal.

8. The method of claim 7, wherein the second threshold value is determined according to:

$$\frac{0.01\%*f}{\max\{m,n\}}.$$

9. The method of claim 5, upon determination that the difference is equal to or greater than the second threshold value, further comprising continuing generation of the first driving signal, and delaying generating the second driving signal until the most recent first pulse width modulation signal is fully generated.

10. An apparatus for generating driving signal, comprising:

a first circuit configured to generate a first driving signal for a first frame of image, the first driving signal comprising a plurality of first pulse width modulation signals, each of the plurality of first pulse width modulation signals configured to have a uniform duration, the first circuit configured to subsequently detect a vertical synchronization signal;

a modulation controller configured to receive the plurality of first pulse width modulation signals to modulate light;

wherein, upon detecting the vertical synchronization signal, the first circuit is configured to:

determine whether a most recent first pulse width modulation signal is partially generated, wherein the most recent first pulse width modulation signal is partially generated if a duration of the most recent first pulse width modulation generated at time when the vertical synchronization signal is detected is less than the uniform duration; and in response to determining the most recent first pulse width modulation signal is partially generated, perform, based on a comparison of the duration of the most recent first pulse width modulation generated with at least one threshold, either one of:

continue generation of the first driving signal, and delay generating of a second driving signal until the most recent first pulse width modulation signal is fully generated;

or terminate generation of the first driving signal; and generate the second driving signal comprising a plurality of second pulse width modulation signals for the second frame of image.

11. The apparatus of claim 10, further comprising a counter configured to count a number of clock signals generated for the most recent first pulse width modulation signal.

12. The apparatus of claim 11, wherein the first circuit is further configured to determine whether a number of clock signals generated for the most recent first pulse width modulation signal when the vertical synchronization signal is detected is less than a first threshold value.

13. The apparatus of claim 12, wherein the first circuit is further configured to terminate generation of the first driving signal; and generate the second driving signal comprising a plurality of second pulse width modulation signals for the second frame of image upon determination that the number of clock signals is less than the first threshold value.

14. The apparatus of claim 11, wherein the first circuit is further configured to determine whether a difference between a number of clock signals generated for the most recent first pulse width modulation signal when the vertical synchronization signal is detected and a target number of clock signals for the most recent first pulse width modulation signal is less than a second threshold value.

15. The apparatus of claim 14, wherein, upon determination that the difference is less than the second threshold value, the first circuit is further configured to:

terminate generation of the first driving signal; and generate the second driving signal comprising a plurality of second pulse width modulation signals for the second frame of image.

16. The apparatus of claim 14, wherein the second threshold value is determined according to:

$$\frac{|Lu(n)-Lu(m)|*f}{|n-m|*Lu(t)*\max\{m,n\}};$$

wherein n stands for a first frame rate of the first frame of image; m stands for a reference frame rate of a reference frame of image; Lu (t) stands for a target luminance value of a respective frame of image; Lu (n) stands for a luminance value of the first frame of image when the vertical synchronization signal is detected; Lu (m) stands for a luminance of the reference frame of image; and f stands for a frequency of clock signals for the plurality of first pulse width modulation signals of the first driving signal.

17. The apparatus of claim 16, wherein the second threshold value is determined according to:

$$\frac{0.01\%*f}{\max\{m,n\}}.$$

18. The apparatus of claim 14, wherein, upon determination that the difference is equal to or greater than the second threshold value, the first circuit is further configured to continue generation of the first driving signal, and delay generating the second driving signal until the most recent first pulse width modulation signal is fully generated.

19. A backlight, comprising the apparatus of claim 10, and a light source connected to the modulation controller.

20. A display apparatus, comprising a display panel, and the backlight of claim 19.

* * * * *